United States Patent [19]

Kawasaki et al.

[11] Patent Number: 5,387,664
[45] Date of Patent: Feb. 7, 1995

[54] HIGHER α-OLEFIN COPOLYMER, VIBRATION-INSULATING RUBBER MOLDED PRODUCT, AND PROCESS FOR THE PREPARATON OF THE RUBBER MOLDED PRODUCT

[75] Inventors: Masaaki Kawasaki; Toshimasa Takata, both of Waki; Keiji Okada; Kazuhiko Murata, both of Ichihara; Mitsuhiko Onda, Kuga; Tetsuo Tojo, Ichihara, all of Japan

[73] Assignee: Mitsui Petrochemical Industries, Ltd., Tokyo, Japan

[21] Appl. No.: 6,984

[22] Filed: Jan. 21, 1993

[30] Foreign Application Priority Data

Jan. 24, 1992 [JP] Japan .................................. 4-011042
Mar. 6, 1992 [JP] Japan .................................. 4-050010

[51] Int. Cl.$^6$ ............................................ C08F 236/20
[52] U.S. Cl. .................................. 526/336; 526/125; 526/128; 526/335; 525/332.1
[58] Field of Search ..................... 526/336, 335; 525/332.1

[56] References Cited

U.S. PATENT DOCUMENTS

| | | |
|---|---|---|
| 2,933,480 | 4/1960 | Gresham et al. . |
| 3,224,985 | 12/1965 | Gladding et al. . |
| 3,291,780 | 12/1966 | Gladding et al. . |
| 3,317,496 | 5/1967 | Natta et al. .................. 526/336 X |
| 3,481,909 | 12/1969 | DiPietro ........................ 526/336 X |
| 3,991,262 | 11/1976 | Lal et al. ....................... 526/336 X |
| 4,284,535 | 8/1981 | Lal et al. . |
| 4,340,705 | 7/1982 | Lal et al. ....................... 526/336 X |
| 5,028,671 | 7/1991 | Kioka et al. . |
| 5,075,396 | 12/1991 | Kashiwa et al. . |

FOREIGN PATENT DOCUMENTS

| | | |
|---|---|---|
| 0344380 | 10/1988 | European Pat. Off. . |
| 0317240 | 5/1989 | European Pat. Off. . |
| 0366290 | 2/1990 | European Pat. Off. . |
| 0423363 | 4/1991 | European Pat. Off. . |
| 0458731 | 11/1991 | European Pat. Off. . |
| 9117194 | 11/1991 | WIPO . |

OTHER PUBLICATIONS

Patent Abstracts of Japan vol. 14, No. 220 (C-717) (4163) Oct. 5, 1990, JPA-0251512 (Japan Synthetic Rubber Co. Ltd.) 21-0201990.
Nielson, Mechanical Properties of Polymers and Composites, Marcel Dekker, Inc., N.Y., 1974 20–1.

*Primary Examiner*—Fred Teskin
*Attorney, Agent, or Firm*—Sherman and Shalloway

[57] ABSTRACT

The higher α-olefin copolymer of the invention is a copolymer of specific higher α-olefin, specific α,ω-diene and specific non-conjugated diene, and this copolymer has a specific molar ratio of the higher α-olefin to the α,ω-diene, a specific content of the non-conjugated diene and a specific intrinsic viscosity. This higher α-olefin copolymer can be prepared using a catalyst for olefin polymerization formed from a specific solid titanium catalyst component, an organometallic compound catalyst component and an electron donor catalyst component. The vibration-insulating rubber molded product of the invention is formed from a vulcanized product of the above-mentioned copolymer. The above-mentioned copolymer is excellent not only in weathering resistance, ozone resistance, thermal aging resistance, low-temperature characteristics, vibration-damping properties and dynamic fatigue resistance but also in processability, so that an excellent vulcanized product can be obtained from the copolymer.

34 Claims, 2 Drawing Sheets

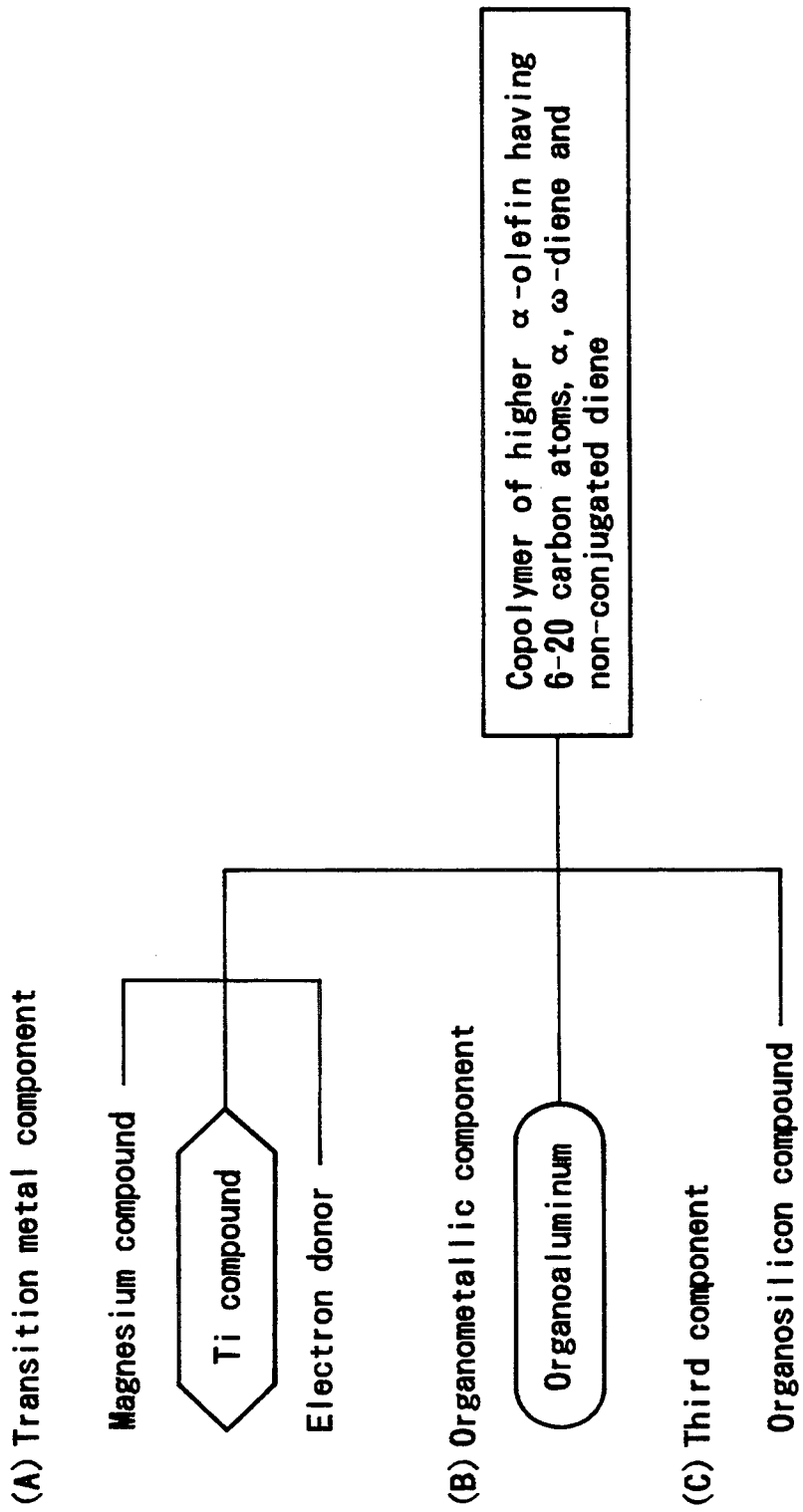

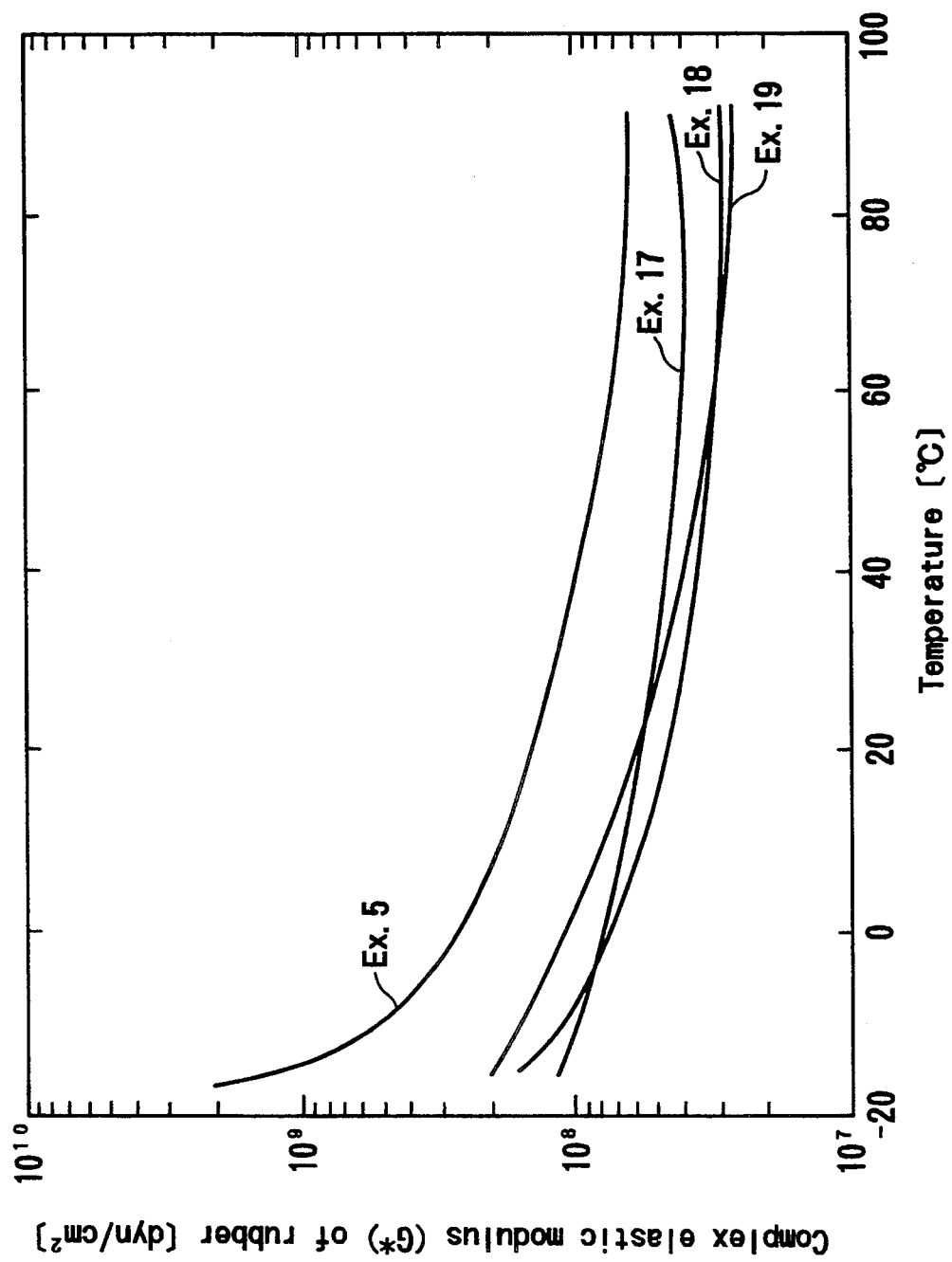

HIGHER α-OLEFIN COPOLYMER, VIBRATION-INSULATING RUBBER MOLDED PRODUCT, AND PROCESS FOR THE PREPARATON OF THE RUBBER MOLDED PRODUCT

FIELD OF THE INVENTION

The present invention relates to a novel higher α-olefin copolymer, a process for the preparation of the copolymer, a vibration-insulating rubber molded product formed from the copolymer and a process for the preparation of the vibration-insulating rubber molded product.

BACKGROUND OF THE INVENTION

Because of their high heat resistance and ozone resistance properties, ethylene/propylene/diene copolymers have been widely used for rubber products such as automotive industrial parts, industrial rubber products, electrical insulating materials, civil engineering and building materials and rubberized fabrics; and plastic blend materials for polypropylene and polystyrene. However, since the ethylene/propylene/diene copolymers are poor in dynamic fatigue resistance, they are not applied to some special uses, for example, rubber vibration insulator, rubber roll, belt, tire, cover materials for vibrating portions, etc.

Natural rubbers are excellent in dynamic fatigue resistance, but they have a problem in practical use because they are low in the heat resistance and the ozone resistance.

With respect to copolymers of higher α-olefin and non-conjugated diene, U.S. Pat. Nos. 3,933,769, 4,064,335 and 4,340,705 disclose a copolymer of higher α-olefin, methyl-1,4-hexadiene and α,ω-diene. The methyl-1,4-hexadiene is a mixture of 4-methyl-1,4-hexadiene and 5-methyl-1,4-hexadiene, and these monomers differ in reaction rate from each other. Accordingly, in the case of performing continuous polymerization, it is difficult to recover those monomers for the repeated use. Further, 4-methyl-1,4-hexadiene is different from 5-methyl-1,4-hexadiene in the copolymerization reactivity with the higher α-olefin, and hence there is such a problem that monomer conversion is low and polymerization efficiency is bad. Moreover, use of α,ω-diene sometimes causes occurrence of gel in the resulting copolymer thereby to give an adverse effect to physical properties of the product finally obtained.

In the processes for preparing the higher α-olefin copolymer described in the above publications, a titanium trichloride type catalyst or a catalyst formed from titanium tetrachloride and organoaluminum is used, and the catalytic activity is not sufficiently high, resulting in a disadvantage of high production cost.

Vibration-insulating rubber molded products are used for insulating or reducing transmission of vibration, and have been widely used for machines, electric appliances, civil engineering and building materials, automobiles, other vehicles, etc. For these vibration-insulating rubber molded products, natural rubbers and SBR have been mainly used heretofore.

However, the environment wherein the vibration-insulating rubber molded products are used has become more severe in recent years, and there has been requested that the vibration-insulating rubber molded products have long life as well as maintenance-free properties.

In that connection, it is studied to utilize ethylene/propylene/diene type rubbers (EPDM) having excellent thermal aging resistance for the vibration-insulating rubber molded products. However, the vibration-insulating rubber products formed from EPDM have such a problem that fatigue easily takes place under vigorous vibration, so-called under dynamic conditions, and they are easily broken.

Accordingly, there has been eagerly desired the advent of long-life vibration-insulating rubber molded products which are excellent in both thermal aging resistance and dynamic fatigue resistance (flexural fatigue resistance).

The present inventors have earnestly studied to pursue copolymers which are excellent not only in dynamic fatigue resistance (flexural fatigue resistance), weathering resistance, ozone resistance, thermal aging resistance and low-temperature characteristics but also in processability, and to pursue long-life vibration-insulating rubber molded products which are excellent in both of thermal aging resistance and dynamic fatigue resistance (flexural fatigue resistance). As a result, they have found that a higher α-olefin copolymer which is excellent in the above-mentioned various properties can be obtained by copolymerizing specific higher α-olefin, specific non-conjugated diene and specific α,ω-diene in the presence of a specific catalyst for olefin polymerization, and accomplished the present invention.

OBJECT OF THE INVENTION

It is a first object of the invention to provide a higher α-olefin copolymer which is excellent not only in dynamic fatigue resistance (flexural fatigue resistance), weathering resistance, ozone resistance, thermal aging resistance and low-temperature characteristics but also in processability, and to provide a process for efficiently preparing this copolymer in a high yield.

It is a second object of the invention to provide a long-life vibration-insulating rubber molded product which is excellent in both of thermal aging resistance and dynamic fatigue resistance (flexural fatigue resistance) and a process for preparing this vibration-insulating rubber molded product.

SUMMARY OF THE INVENTION

The higher α-olefin copolymer according to the present invention is a higher α-olefin copolymer of higher α-olefin having 6 to 20 carbon atoms, α,ω-diene represented by the following formula [I] and non-conjugated diene represented by the following formula [II], said copolymer having:

(A) a molar ratio of the higher α-olefin to the α,ω-diene [higher α-olefin/α,ω-diene] ranging from 95/5 to 50/50, (B) a content of the non-conjugated diene ranging from 0.01 to 30% by mol, and (C) an intrinsic viscosity [η], as measured in decahydronaphthalene at 135° C., of 1.0 to 10.0 dl/g;

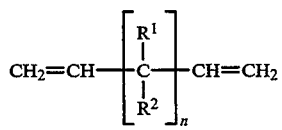

[I]

wherein n is an integer of 1 to 3, $R^1$ and $R^2$ are each independently a hydrogen atom or an alkyl group having 1 to 8 carbon atoms;

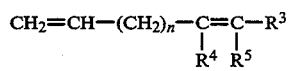   [II]

wherein n is an integer of 1 to 5, $R^3$ is an alkyl group having 1 to 4 carbon atoms, and $R^4$ and $R^5$ are each independently a hydrogen atom or an alkyl group having 1 to 8 carbon atoms, provided that both of $R^4$ and $R^5$ are not hydrogen atoms.

The process for the preparation of a higher α-olefin copolymer according to the invention is a process comprising copolymerizing higher α-olefin having 6 to 20 carbon atoms, α,ω-diene represented by the above-mentioned formula [I] and non-conjugated diene represented by the above-mentioned formula [II] in the presence of a catalyst for olefin polymerization comprising:

(a) a solid titanium catalyst component containing magnesium, titanium, halogen and an electron donor as essential components, (b) an organoaluminum compound catalyst component, and (c) an electron donor catalyst component.

The vibration-insulating rubber molded product according to the present invention is a vibration-insulating rubber molded product comprising a vulcanized product of a higher α-olefin copolymer, said copolymer being a copolymer of higher α-olefin having 6 to 20 carbon atoms, α,ω-diene represented by the following formula [I] and non-conjugated diene represented by the following formula [II] and having:

(A) a molar ratio of the higher α-olefin to the α,ω-diene [higher α-olefin/α,ω-diene] ranging from 95/5 to 50/50, (B) a content of the non-conjugated diene ranging from 0.01 to 30% by mol, and (C) an intrinsic viscosity [η], as measured in decahydronaphthalene at 135° C., of 1.0 to 10.0 dl/g.

The process for the preparation of a vibration-insulating rubber molded product according to the present invention is a process comprising molding and vulcanizing the above-mentioned higher α-olefin copolymer.

BRIEF DESCRIPTION OF THE DRAWING

FIG. 1 is a flow chart illustrating steps for preparing a catalyst for olefin polymerization employable for preparing a higher α-olefin copolymer of the present invention.

FIG. 2 graphically shows a relationship between complex elastic modulus (G*) of a rubber and a temperature.

DETAILED DESCRIPTION OF THE INVENTION

The higher α-olefin copolymer of the present invention, the process for the preparation of said copolymer, the vibration-insulating rubber molded product and the process for the preparation of said molded product, according to the present invention, are described in detail hereinafter.

At first, the higher α-olefin copolymer of the invention is described below.

The higher α-olefin copolymer of the invention is a specific copolymer composed of specific higher α-olefin, specific α,ω-diene and specific non-conjugated diene in a specific ratio therebetween.

Higher α-olefin

The higher α-olefin employable in the invention is a higher α-olefin having 6 to 20 carbon atoms. Concrete examples of the higher α-olefin include hexene-1, heptene-1, octene-1, nonene-1, decene-1, undecene-1, dodecene-1, tridecene-1, tetradecene-1, pentadecene-1, hexadecene-1, heptadecene-1, nonadecene-1, eicosene-1, 9-methyldecene-1, 11-methyldecene-1 and 12-ethyltetradecene-1.

In the invention, the above-exemplified higher α-olefins may be used singly or in combination of two or more kinds. Of these higher α-olefins, particularly preferably used are hexene-1, octene-1 and decene-1.

α,ω-olefin

The α,ω-diene employable in the invention is represented by the following formula [I].

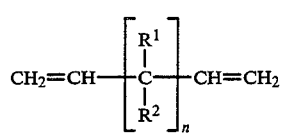   [I]

In the above formula [I], n is an integer of 1 to 3, $R^1$ and $R^2$ are each independently a hydrogen atom or an alkyl group having 1 to 8 carbon atoms.

Concrete examples of the α,ω-diene include 1,4-pentadiene, 1,5-hexadiene, 1, 6-heptadiene, 3-methyl-1,4-pentadiene, 3-methyl-1,5-hexadiene, 3-methyl-1,6-heptadiene, 4-methyl-1,6-heptadiene, 3,3-dimethyl-1,4-hexadiene, 3,4-dimethyl-1,5-hexadiene, and 4,4-dimethyl-1,6-heptadiene In the higher α-olefin copolymer of the invention, when each of the above $R^1$ and $R^2$ is hydrogen, it is presumed that repeating units derived from the α, ω-diene exist in the form represented by the following formula [III] and/or the following formula [IV].

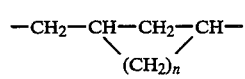   [III]

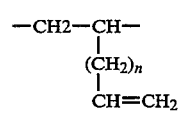   [IV]

In the higher α-olefin copolymer of the invention, the above-mentioned repeating units are arranged at random to form a substantially linear structure. The structure of these repeating units can be confirmed by means of $^{13}C$-NMR. By the expression "a substantially linear structure" used herein is meant that the substantially linear structure may contain a branched chain structure but does not contain a network crosslinking structure. It can be confirmed that the higher α-olefin copolymer of the invention has a substantially linear structure by the fact that this copolymer is completely dissolved in decahydronaphthalene at 135° C. and contains no crosslinking copolymer in gel form.

Non-conjugated diene

The non-conjugated diene employable in the invention is represented by the following formula [II].

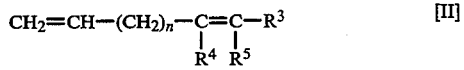

In the above formula [II], n is an integer of 1 to 5, $R^3$ is an alkyl group having 1 to 4 carbon atoms, and $R^4$ and $R^5$ are each independently a hydrogen atom or an alkyl group having 1 to 8 carbon atoms, provided that both of $R^4$ and $R^5$ are not hydrogen atoms.

Concrete examples of the non-conjugated diene include 4-methyl-1,4-hexadiene, 5-methyl-1,4-hexadiene, 4-ethyl-1,4-hexadiene, 5-methyl-1,4-heptadiene, 5-ethyl-1,4-heptadiene, 5-methyl-1,5-heptadiene, 6-methyl-1,5-heptadiene, 5-ethyl-1,5-heptadiene, 4-methyl-1,4-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6 -octadiene, 7-methyl-1,6-octadiene, 6-ethyl-1,6-octadiene, 4-methyl-1, 4-nonadiene, 5-methyl-1,4-nonadiene, 4-ethyl-1, 4-nonadiene, 5-ethyl-1,4-nonadiene, 5-methyl-1,5-nonadiene, 6-methyl-1,5-nonadiene, 5-ethyl-1,5-nonadiene, 6-ethyl-1, 5-nonadiene, 6-methyl-1, 6-nonadiene, 7-methyl-1,6-nonadiene, 6-ethyl-1, 6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 7-methyl-1,6-decadiene, 6-ethyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene and 9-methyl-1,8-undecadiene.

In the invention, the above-exemplified non-conjugated dienes may be used singly or in combination of two or more kinds.

In addition to the above non-conjugated dienes, other copolymerizable monomers such as ethylene, propylene, butene-1 and 4-methylpentene-1 may be used with the proviso that the objects of the present invention are not marred.

A molar ratio of constituent units derived from the higher α-olefin to constituent units derived from the α,ω-diene (higher α-olefin/α,ω-diene), both constituting the higher α-olefin copolymer of the invention, is within the range of 50/50 to 95/5, preferably 60/40 to 90/10, more preferably 65/35 to 90/10. The values of the molar ratio are those determined by means of a $^1$C-NMR method.

In the present invention, higher α-olefin is copolymerized with α,ω-diene to improve processability of the resulting higher α-olefin copolymer.

The content of the non-conjugated diene in the higher α-olefin copolymer of the invention is in the range of 0.01 to 30% by mol, preferably 0.1 to 20% by mol, particularly preferably 0.1 to 10% by mol. The iodine value of the higher α-olefin copolymer is in the range of 1 to 50, preferably 2 to 30. This property value is a measure of vulcanization of the higher α-olefin copolymer of the invention using sulfur or peroxide.

The higher α-olefin copolymer of the invention has an intrinsic viscosity [η], as measured in decalin at 135° C., of 1.0 to 10.0 dl/g, preferably 1.5 to 7 dl/g. This property value is a measure of a molecular weight of the higher α-olefin copolymer of the invention, and is useful in combination with other property values to obtain a copolymer of excellent properties such as weathering resistance, ozone resistance, thermal aging resistance, low-temperature characteristics and dynamic fatigue resistance.

The higher α-olefin copolymer of the invention can be prepared by the following process.

The higher α-olefin copolymer of the invention can be obtained by copolymerizing higher α-olefin, α,ω-diene represented by the aforementioned formula [I] and non-conjugated diene represented by the aforementioned formula [II] in the presence of a catalyst for olefin polymerization.

The catalyst for olefin polymerization employable in the invention comprises a solid titanium catalyst component [A-1], an organometallic compound catalyst component [B] and an electron donor catalyst component [C].

FIG. 1 is a flow chart illustrating steps for preparing the catalyst for olefin polymerization employable for preparing the higher α-olefin copolymer of the invention.

The solid titanium catalyst component [A-1] used in the invention is a highly active catalyst component containing magnesium, titanium, halogen and an electron donor as essential components.

The solid titanium catalyst component [A-1] can be prepared by using for example a titanium compound, a magnesium compound and if desired an electron donor, and bringing them into contact with each other.

Examples of the titanium compounds employable for preparing the solid titanium catalyst component [A-1] include tetravalent titanium compounds and trivalent titanium compounds.

As the tetravalent titanium compounds, there can be mentioned compounds represented by the following formula:

wherein R is a hydrocarbon group, X is a halogen atom, and g is a number satisfying the condition of 0 ≦g≦4.

Concrete examples of such compounds are described below.

Titanium tetrahalides such as $TiCl_4$, $TiBr_4$ and $TiI_4$
Alkoxytitanium trihalides such as:
Ti($OCH_3$)$Cl_3$,
Ti($OC_2H_5$)$Cl_3$,
Ti (On-$C_4H_9$)$Cl_3$,
TI ($OC_2H_5$)$Br_3$, and
TI (O-iso-$C_4H_9$)$Br_3$
Dialkoxytitanium dihalides such as:
Ti ($OCH_3$)$_2Cl_2$,
Ti ($OC_2H_5$)$_2Cl_2$,
Ti (On-$C_4H_9$)$_2Cl_2$, and
Ti ($OC_2H_5$)$_2Br_2$
Trialkoxytitanium monohalides such as:
Ti ($OCH_3$)$_3Cl$,
Ti ($OC_2H_5$)$_3Cl$,
Ti (On-$C_4H_9$)$_3Cl$, and
Ti ($OC_2H_5$)$_3Br$
Tetraalkoxytitaniums such as:
Ti ($OCH_3$)$_4$,
Ti ($OC_2H_5$)$_4$, Ti (On-C4H9)4,
Ti (O-iso-C4H9)4, and
Ti (O-2-ethylhexyl)4

Of these, preferred are titanium tetrahalides, and particularly preferred is titanium tetrachloride. These titanium compounds may be used singly or in combination. Further, they can be used after diluting them in hydrocarbons or halogenated hydrocarbons.

As the trivalent titanium compound, titanium trichloride is employed.

Preferably used titanium trichloride is that obtained by bringing titanium tetrachloride into contact with hydrogen, a metal (e.g., magnesium metal, aluminum metal and titanium metal) or an organometallic compound (e.g., organomagnesium compound, organoaluminum compound and organozinc compound) so as to be reduced.

The magnesium compounds employable for preparing the solid titanium catalyst component [A-1] may or may not have reducing ability.

An example of the magnesium compounds having reducing ability is a compound represented by the following formula:

$$X_n MgR_{2-n}$$

wherein n is a number satisfying the condition of $0 \leq n < 2$; R is hydrogen, an alkyl group of 1-20 carbon atoms, an aryl group or a cycloalkyl group; when n is 0, two of R may be the same or different from each other; and X is halogen.

Concrete examples of the organomagnesium compounds having reducing ability include:
dialkylmagnesium compounds such as dimethylmagnesium, diethylmagnesium, dipropylmagnesium, dibutylmagnesium, diamylmagnesium, dihexylmagnesium, didecylmagneisum, octylbutylmagnesium and ethylbutylmagnesium;
alkylmagnesium halides such as ethylmagnesium chloride, propylmagnesium chloride, butylmagnesium chloride, hexylmagnesium chloride and amylmagnesium chloride;
alkylmagnesium alkoxides such as butylethoxymagnesium, ethylbutoxymagnesium and octylbutoxymagnesium; and
butylmagnesium hydride.

Concrete examples of the magnesium compounds not having reducing ability include:
magnesium halides such as magnesium chloride, magnesium bromide, magnesium iodide and magnesium fluoride;
alkoxymagnesium halides such as methoxymagnesium chloride, ethoxymagnesium chloride, isopropoxymagnesium chloride, butoxymagnesium chloride and octoxymagnesium chloride;
aryloxymagnesium halides such as phenoxymagnesium chloride and methylphenoxymagnesium chloride; alkoxymagnesiums such as ethoxymagnesium, isopropoxymagnesium, butoxymagnesium, n-octoxymagnesium and 2-ethylhexoxymagnesium;
aryloxymagnesiums such as phenoxymagnesium and dimethylphenoxymagnesium; and
carboxylic acid salts of magnesium such as magnesium laurate and magnesium stearate.

Also employable as the magnesium compound not having reducing ability are other magnesium metals and hydrogenated magnesium.

The above-mentioned magnesium compounds not having reducing ability may be compounds derived from the aforementioned magnesium compounds having reducing ability or compounds derived during the preparation of the catalyst components. In order to derive the magnesium compounds not having reducing ability from the magnesium compounds having reducing ability, for example, the magnesium compounds having reducing ability are brought into contact with polysiloxane compounds, halogen-containing silane compounds, halogen-containing aluminum compounds, esters, alcohols, halogen-containing compounds or compounds having an OH group or an active carbon-oxygen bond.

The above-mentioned magnesium compounds having or not having reducing ability may form the later-described organometallic compounds such as complex compounds with other metals (e.g., aluminum, zinc, boron, beryllium, sodium and potassium) and complex compounds therewith, or may be in the form of a mixture with other metal compound. Further, the magnesium compounds may be used singly or in combination of two or more kinds of the above-mentioned compounds. Moreover, the magnesium compounds may be used either in the liquid form or in the solid form. When the used magnesium compound is solid, the compound can be changed to liquid state using alcohols, carboxylic acids, aldehydes, amines, metallic acid esters, etc. which are described later as electron donors.

Other various magnesium compounds than the above-mentioned ones can be also employed for preparing the solid titanium catalyst component [A-1], but preferred are those in the form of halogen-containing magnesium compounds in the finally obtained solid titanium catalyst component [A-1]. Accordingly, if a magnesium compound not containing halogen is used, the compound is preferably brought into contact with a halogen-containing compound to be reacted therewith on the way to prepare the solid titanium catalyst component.

Among the above-mentioned various magnesium compounds, preferred are magnesium compounds not having reducing ability, and of these, magnesium chloride, alkoxymagnesium chloride and aryloxymagnesium chloride are particularly preferred.

In the preparation of the solid titanium catalyst component [A-1], it is preferred to use an electron donor.

Examples of the electron donors include:
oxygen-containing electron donors such as alcohols, phenols, ketones, aldehydes, carboxylic acids, organic acid halides, esters of organic or inorganic acids, ethers, diethers, acid amides, acid anhydrides and alkoxysilane; and
nitrogen-containing electron donors such as ammonias, amines, nitriles, pyridines and isocyanates.

In more concrete, there can be mentioned for example:
alcohols of 1-18 carbon atoms such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol and isopropylbenzyl alcohol;
halogen-containing alcohols of 1-18 carbon atoms such as trichloromethanol, trichloroethanol and trichlorohexanol;
phenols of 6-20 carbon atoms which may have a lower alkyl group such as phenol, cresol, xylenol, ethyl phenol, propyl phenol, nonyl phenol, cumyl phenol and naphthol;

ketones of 3–15 carbon atoms such as acetone, methyl ethyl ketone, methyl isobutyl ketone, acetophenone, benzophenone and benzoquinone;

aldehydes of 2–15 carbon atoms such as acetaldehyde, propionaldehyde, octylaldehyde, benzaldehyde, tolualdehyde and naphthaldedehyde;

organic acid esters of 2–18 carbon atoms such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, cumarine, phthalide and ethyl carbonate;

acid halides of 2–15 carbon atoms such as acetyl chloride, benzoyl chloride, toluic acid chloride and anisic acid chloride;

ethers of 2–20 carbon atoms such as methyl ether, ethyl ether, isopropyl ether, butyl ether, amyl ether, tetrahydrofuran, anisole and diphenyl ether;

acid amides such as N,N-dimethylacetamide, N,N-dimethylbenzamide and N,N-dimethyltoluamide;

amines such as trimethylamine, triethylamine, tributylamine, tribenzylamine and tetramethylethylenediamine;

nitriles such as acetonitrile, benzonitrile and trinitrile;

pyridines such as pyridine, methyl pyridine, ethyl pyridine and dimethyl pyridine; and acid anhydrides such as acetic anhydride, phthalic anhydride and benzoic anhydride.

Preferred examples of the organic acid esters are polycarboxylates having skeleton of the following formula

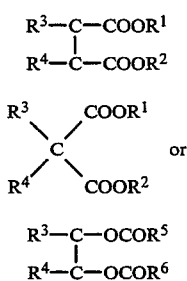

In the above formulas, $R^1$ is a substituted or unsubstituted hydrocarbon group; each of $R^2$ $R^5$ and $R^6$ is hydrogen or a substituted or unsubstituted hydrocarbon group; and each of $R^3$ and $R^4$ is hydrogen or a substituted or unsubstituted hydrocarbon group, preferably at least one of them being a substituted or unsubstituted hydrocarbon group. $R^3$ and $R^4$ may be bonded to each other to form a cyclic structure. When the hydrocarbon groups $R^1$ to $R^6$ are substituted, the substituted groups contain different atoms such as N, O and S, and have groups such as C—O—C, COOR, COOH, OH, $SO_3H$, —C—N—C—and $NH_2$.

Concrete examples of the polycarboxylates include:
aliphatic polycarboxylates,
alicyclic polycarboxylates,
aromatic polycarboxylates, and
heterocyclic polycarboxylates.

Preferred examples of the polycarboxylates are n-butyl maleate, diisobutyl methylmaleate, di-n-hexyl cyclohexenecarboxylate, diethyl nadiate, diisopropyl tetrahydrophthalate, diethyl phthalate, diisobutyl phthalate, di-n-butyl phthalate, di-2-ethylhexyl phthalate and dibutyl 3,4-furandicarboxylate.

Particularly preferred examples of the polycarboxylates are phthalates.

As the diether compounds, there can be mentioned compounds represented by the following formula:

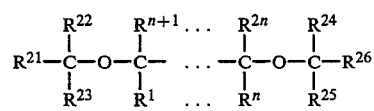

wherein n is an integer satisfying the condition of $2 \leq n \leq 10$; $R^1$ to $R^{26}$ are substituent groups having at least one element selected from carbon, hydrogen, oxygen, halogen, nitrogen, sulfur, phosphorus, boron and silicon; any optional combination of from $R^1$ to $R^{26}$, preferably $R^1$ to $R^{2n}$, may form in corporation a ring other than a benzene ring; and an atom other than a carbon atom may be contained in the main chain.

Preferred examples thereof are:
2,2-diisobutyl-1,3-dimethoxypropane,
2-isopropyl-2-isopentyl-1,3-dimethoxypropane,
2,2-dicyclohexyl-1,3-dimethoxypropane, and
2,2-bis (cyclohexylmethyl) -1,3-dimethoxypropane.

The above-mentioned electron donors may be used in combination of two or more kinds.

In the preparation of the solid titanium catalyst component [A-1] employable in the invention, the above-mentioned various compounds may be brought into contact with organic or inorganic compounds containing silicon, phosphorus, aluminum, etc. which are conventionally used as carrier compounds and reaction assistants.

Useful carrier compounds are $Al_2O_3$, $SiO_2$, $B_2O_3$, MgO, CaO, $TiO_2$, ZnO, $SnO_2$, BaO, ThO and a resin such as a styrene/divinylbenzene copolymer. Of these, preferred are. $Al_2O_3$, $SiO_2$ and a styrene/divinylbenzene copolymer.

The solid titanium catalyst component [A-1] employable in the invention is prepared by bringing the aforementioned titanium compound and magnesium compound (and preferably further the above-mentioned electron donor) into contact with each other.

There is no specific limitation on a process for preparing the solid titanium catalyst component [A-1] using those compounds. Examples of the processes using a tetravalent titanium compound are briefly described below.

(1) A process comprising bringing a solution consisting of a magnesium compound, an electron donor and a hydrocarbon solvent into contact with an organometallic compound, after or simultaneously with precipitating a solid by bringing the solution into contact with a titanium compound.

(2) A process comprising bringing a complex composed of a magnesium compound and an electron donor into contact with an organometallic compound, and then bringing the reaction product into contact with a titanium compound.

(3) A process comprising bringing a product obtained by the contact of an inorganic carrier and an organic magnesium compound into contact with a titanium compound. In this case, the above product may be beforehand brought into contact with a halogen-containing compound, an electron donor and/or an organometallic compound.

(4) A process comprising obtaining an inorganic or organic carrier on which a magnesium compound is supported from a mixture of an inorganic or organic carrier and a solution containing a magnesium compound and an electron donor (and further a hydrogen solvent in some cases), and then bringing the obtained carrier into contact with a titanium compound.

(5) A process comprising bringing a solution containing a magnesium compound, a titanium compound and an electron donor (and further a hydrogen solvent in some cases) into contact with an inorganic or organic carrier to obtain a solid titanium catalyst component [A-1] on which magnesium and titanium are supported.

(6) A process comprising bringing a liquid organic magnesium compound into contact with a halogen-containing titanium compound.

(7) A process comprising bringing a liquid organic magnesium compound into contact with a halogen-containing compound, and then bringing the product thus obtained into contact with a titanium compound.

(8) A process comprising bringing an alkoxy group-containing magnesium compound into contact with a halogen-containing titanium compound.

(9) A process comprising bringing a complex composed of an alkoxy group-containing magnesium compound and an electron donor into contact with a titanium compound.

(10) A process comprising bringing a complex composed of an alkoxy group-containing magnesium compound and an electron donor into contact with an organometallic compound, and then bringing the product thus obtained into contact with a titanium compound.

(11) A process comprising bringing a magnesium compound, an electron donor and a titanium compound into contact with each other in an optional order. In this reaction, each components may be pretreated with an electron donor and/or a reaction assistant such as an organometallic compound or a halogen-containing silicon compound.

(12) A process comprising bringing a liquid magnesium compound not having reducing ability into contact with a liquid titanium compound, if necessary in the presence of an electron donor, to precipitate a solid magnesium/titanium complex compound.

(13) A process comprising further bringing the reaction product obtained in the above process (12) into contact with an titanium compound.

(14) A process comprising further bringing the reaction product obtained in the above process (11) or (12) into contact with an electron donor and a titanium compound.

(15) A process comprising pulverizing a magnesium compound and a titanium compound (and if necessary an electron donor) to obtain a solid product, and treating the solid product with either halogen, a halogen compound or aromatic hydrocarbon.

This process may include a step of pulverizing only a magnesium compound, a step of pulverizing a complex compound composed of a magnesium compound and an electron donor, or a step of pulverizing a magnesium compound and a titanium compound. Further, after the pulverization, the solid product may be subjected to a pretreatment with a reaction assistant and then subjected to a treatment with halogen or the like. Examples of the reaction assistants include an organometallic compound and a halogen-containing silicon compound.

(16) A process comprising pulverizing a magnesium compound, and then bringing the pulverized magnesium compound into contact with a titanium compound. In this case, an electron donor or a reaction assistant may be used in the pulverization stage and/or the contacting stage.

(17) A process comprising treating the compound obtained in any of the above processes (11) to (16) with halogen, a halogen compound or aromatic hydrocarbon.

(18) A process comprising bringing the reaction product obtained by the contact of a metal oxide, an organic magnesium compound and a halogen-containing compound into contact with a titanium compound and if necessary an electron donor.

(19) A process comprising bringing a magnesium compound such as a magnesium salt of organic acid, alkoxymagnesium or aryloxymagnesium into contact with a titanium compound and/or halogen-containing hydrocarbon and if necessary an electron donor.

(20) A process comprising bringing a hydrocarbon solution containing at least a magnesium compound and alkoxytitanium into contact with a titanium compound and/or an electron donor. In this case, a halogen-containing compound such as a halogen-containing silicon compound may be further brought into contact therewith, if necessary.

(21) A process comprising bringing a liquid magnesium compound not having reducing ability into contact with an organometallic compound so as to precipitate a solid magnesium/metal (aluminum) complex compound, and then bringing the solid double compound into contact with a titanium compound and if necessary an electron donor.

Preparation of the solid titanium catalyst component [A-1] is generally carried out at a temperature of −70° to 200° C., preferably −50° to 150° C.

The solid titanium catalyst component [A-1] thus obtained contains titanium, magnesium and halogen, and preferably further contains an electron donor in addition thereto.

In the solid titanium catalyst component [A-1], a ratio of halogen/titanium (atomic ratio) is 2–200, preferably 4–90, and a ratio of magnesium/titanium (atomic ratio) is 1–100, preferably 2–50.

The electron donor is contained generally in the electron donor/titanium ratio (molar ratio) of 0.01 to 100, preferably 0.05 to 50.

As for the solid titanium catalyst component [A-1], examples using a titanium compound are described in the invention, but the titanium used in the above compounds can be replaced with zirconium, hafnium, vanadium, niobium, tantalum or chromium.

Processes for preparing the titanium trichloride catalyst component [A-I] are described in detail, for example, in Japanese Laid-open Publications No.

50(1975)108385, No. 50(1975)-126590, No. 51(1976)-20297, No. 51(1976)-28189, No. 51(1976)-64586, No. 51 (1976)-92885, No. 51(1976)-136625, No. 52(1977)-87489, No. 52 (1977)-100596, No. 52 (1977)-147688, No. 52(1977)-104593, No. 53(1978)-2580, No. 53 (1978)-40093, No. 53 (1978)-40094, No. 53(1978)-43094, No. 55 (1980)-135102, No. 55(1980)-135103, No. 55(1980)-152710, No. 56(1981)-811, No. 56(1981)-11908, No. 56(1981)-18606, No. 58(1983)-83006, No. 58(1983)-138705. No. 58 (1983)-138706, No. 58(1983)-138707, No. 58(1983)-138708, No. 58(1983)-138709, No. 58(1983)-138710, No. 58(1983)-138715, No. 60(1985)-23404, No. 61(1986)-21109, No. 61(1986)-37802 and No. 61(1986)-37803.

In the invention, a titanium trichloride catalyst component [A-2] which is conventionally known can be also employed as other example of the solid titanium catalyst component exemplified as the transition metal compound catalyst component [A].

Processes for preparing the titanium trichloride catalyst component [A-2] are described in detail, for example, in Japanese Patent Laid-open Publications No. 63(1988)-17274, No. 64(1989)-38409, No. 56(1981)-34711, No. 61(1986)-287904, No. 63(1988)-75007, No. 63(1988)-83106, No. 59(1984)-13630, No. 63(1988)-108008, No. 63(1988)-27508, No. 57(1982)-70110, No. 58(1983)-219207, No. 1(1989)-144405 and No. 1(1989)-292011.

An example of the titanium trichloride catalyst component [A-2] is the aforementioned titanium trichloride. The titanium trichloride can be used together with the aforementioned electron donor and/or tetravalent titanium compound, or can be used after those components are brought into contact with each other.

Next, the organometallic compound catalyst component [B] containing a metal selected from metals in Group I to Group III of a periodic table which is used for preparing the α-olefin/polyene copolymer-containing polymer [I ] will be described.

As the organometallic compound catalyst component [B], there can be employed for example an organoaluminum compound [B-1], an alkyl complex compound composed of a metal in Group I of a periodic table and aluminum, an organometallic compound of a metal in Group II of a periodic table.

The organoaluminum compound [B-1] is, for example, the organoaluminum compound represented by the following formula:

wherein $R^a$ is hydrocarbon of 1–12 carbon atoms, X is halogen or hydrogen, and n is 1–3.

In the above-mentioned formula, $R^a$ is hydrocarbon group of 1–12 carbon atoms, such as, alkyl, cycloalkyl or aryl, including concretely methyl, ethyl, n-propyl, isopropyl, isobutyl, pentyl, hexyl, octyl, cyclopentyl, cyclohexyl, phenyl, tolyl, etc.

The organoaluminum compounds include, in concrete, such compounds as mentioned below.

Trialkylaluminum such as trimethylaluminum, triethylaluminum, triisopropylaluminum, triisobutylaluminum, trioctylaluminum, tri-2-ethylhexylaluminum, etc;

alkenylaluminum such as isoprenylaluminum, etc;

dialkylaluminum halides such as dimethylaluminum chloride, diethylaluminum chloride, diisopropylaluminum chloride, diisobutylaluminum chloride, dimethylaluminum bromide, etc;

alkylaluminum sesquihalides such as methylaluminum sesquichloride, ethylaluminum sesquichloride, isopropylaluminum sesquichloride, butylaluminum sesquichloride, ethylaluminum sesquibromide, etc;

alkylaluminum dihalides such as methylaluminum dichloride, ethylaluminum dichloride, isopropylaluminum dichloride, ethylaluminum dibromide, etc, and alkylaluminum hydride such as diethylaluminum hydride and diisobutylaluminum hydride.

As the organoaluminum compounds [B-1], there may also be used a compound represented by the following formula:

wherein $R^a$ is as defined above, Y is $-OR^b$, $-OSiR^c_3$, $-OAlR^d_2$, $-NR^e_2$, $-SiR^f_3$, or $-N(R^g)AlR^h_2$ n is 1–2 and $R^b$, $R^c$, $R^d$ and $R^h$ are each methyl, ethyl, isopropyl, isobutyl, cyclohexyl, phenyl, etc;

$R^e$ is hydrogen, methyl, ethyl, isopropyl, phenyl, trimethylsilyl, etc; and $R^f$ and $R^g$ are each methyl, ethyl, etc.

The organoaluminum compounds [B-1] include, in concrete, such compounds as mentioned below.

(i) Compounds of the formula $R^a_n Al(OR^b)_{3-n}$ such as dimethylaluminum methoxide, diethylaluminum ethoxide, diisobutylaluminum methoxide, etc;

(ii) Compounds of the formula $R^a_n Al(OSiR^c_3)_{3-n}$ such as $Et_2Al(OSiMe_3)$, $(iso\text{-}Bu)_2Al(OSiMe_3)$, $(iso\text{-}Bu)_2Al(OSiEt_3)$, etc;

(iii) Compounds of the formula $R^a_n Al(OAlR^d_2)_{3-n}$ such as $Et_2AlOAlEt_2$, $(iso\text{-}Bu)_2AlOAl(iso\text{-}Bu)_2$, etc;

(iv) Compounds of the formula $R^a_n Al(NR^e_2)_{3-n}$ such as $Me_2AlNEt_2$, $Et_2AlNHMe$, $Me_2AlNHEt$; $Et_2AlN(Me_3Si)_2$, $(iso\text{-}Bu)_2AlN(Me_3Si)_2$, etc;

(v) Compounds of the formula $R^a_n Al(SiR^f_3)_{3-n}$ such as $(iso\text{-}Bu)_2AlSiMe_3$, etc; and (vi) Compounds of the formula $R^a_n Al[N(R^g)\text{-}AlR^h_2]_{3-n}$ such as $Et_2AlN(Me)\text{-}AlEt_2$, $(iso\text{-}Bu)_2AlN(Et)Al(iso\text{-}Bu)_2$, etc.

Of the organoaluminum compounds [B-1] as exemplified above, preferred are those of the formula $R^a_3Al$, $R^a_n Al(OR^b)_{3-n}$ or $R^a_n Al(OAlR^d_2)_{3-n}$.

The alkyl complex compound composed of a metal in Group I of a periodic table and aluminum can be exemplified by a compound represented by the following formula:

wherein $M^1$ is Li, Na or K, and $R^j$ is a hydrocarbon group of 1–15 carbon atoms.

Concrete examples of the alkyl complex compounds include $LiAl(C_2H_5)_4$ and $LiAl(C_7H_{15})_4$.

The organometallic compound of a metal in Group II of a periodic table can be exemplified by a compound represented by the following formula:

wherein each of $R_1$ and $R_2$ is a hydrocarbon group of 1–15 carbon atoms or a halogen, $R_1$ and $R_2$ may be the same or different from each other but excluding a case where both of them are halogens, and $M_2$ is Mg, Zn or Cd.

Concrete examples thereof include diethylzinc, diethylmagnesium, butylethylmagnesium, ethylmagnesium chloride and butylmagnesium chloride.

These compounds may be employed in combination of two or more kinds.

Examples of useful electron donor catalyst component [C] used in the present invention are the electron donor mentioned above and an organosilicon compound represented by the following formula:

$$R_nSi(OR')_{4-n}$$

wherein each of R and R' is a hydrocarbon group, and n number satisfying the condition of $0 < n < 4$.

Concrete examples of the organosilicon compounds represented by the above formula include:
trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, dicyclohexyldimethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilne, n-butyltriethoxysilane, isobutyltriethoxysilane, phenyltriethoxysilane, γ-aminopropyltriethoxysilane, chlorotriethoxysilane, ethyltriisopropoxysilane, vinyltributoxysilane, cyclohexyltrimethoxysilane, cyclohexyltriethoxysilane, 2-norbornanetrimethoxysilane, norbornanetriethoxysilane, 2-norbornanemethyldimethoxysilane, ethyl silicate, butyl silicate, trimethylphenoxysilane, methyltriallyoxysilane, vinyltris(β-methoxyethoxysilane), vinyltriacetoxysilane, dimethltetraethoxysilane, cyclopentyltrimethoxysilane, 2-methylcyclopentyltrimethoxysilane, 2,3-dimethylcyclopentyltrimethoxysilane, cyclopentyltriethoxysilane, dicyclopentyldimethoxysilane, bis (2-methylcyclopentyl)dimethoxysilane, bis (2,3-dimethylcyclopentyl)dimethoxysilane, dicyclopentyldiethoxysilane, tricyclopentylmethoxysilane, tricyclopentylethoxysilane, dicyclopentylmethylmethoxysilane, dicyclopentylethylmethoxysilane, hexenyltrimethoxysilane, dicyclopentylmethylethoxysilane, cyclopentyldimethylmethoxysilane, cyclopentyldiethylmethoxysilane, and cyclopentyldimethylethoxysilane.

Of these, preferably used are ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane, phenyltriethoxysilane, dicyclopentyldimethoxysilane, hexenyltrimethoxysilane, cyclopentyltriethoxysilane, tricyclopentylmethoxysilane and cyclopentyldimethylmethoxysilane.

The catalyst for olefin polymerization employable in the invention comprises the above-mentioned solid titanium catalyst component [A-1], organometallic compound catalyst component [B] and electron donor catalyst component [C], and in the invention, higher α-olefin is copolymerized with α,ω-diene and non-conjugated diene using this catalyst for olefin polymerization. It is also possible to prepolymerize α-olefin or higher α-olefin using this catalyst for olefin polymerization and then polymerize higher α-olefin with α,ω-diene and non-conjugated diene using this catalyst for olefin polymerization. In the prepolymerization, α-olefin or higher α-olefin is prepolymerized in an amount of 0.1 to 500 g, preferably 0.3 to 300 g, particularly preferably 1 to 100 g, based on 1 g of the catalyst for olefin polymerization.

The catalyst concentration in the reaction system for the prepolymerization may be much higher than that in the reaction system for the polymerization.

The amount of the solid titanium catalyst component [A-1] in the prepolymerization is generally in the range of about 0.01 to 200 mmol, preferably about 0.1 to 100 mmol, more preferably 1 to 50 mmol, in terms of titanium atom, based on 1 liter of the later-described inert hydrocarbon medium.

The organometallic compound catalyst component [B] is used in such an amount that a polymer would be produced in an amount of 0.1 to 500 g, preferably 0.3 to 300 g, per 1 g of the solid titanium catalyst component [A-1]. In concrete, the amount of the organometallic compound catalyst component [B] is generally in the range of about 0.1 to 100 mol, preferably about 0.5 to 50 mol, more preferably 1 to 20 mol, based on 1 mol of the titanium atom contained in the solid titanium catalyst component [A-1].

The electron donor catalyst component [C] is used in an amount of generally 0.1 to 50 mol, preferably 0.5 to 30 mol, more preferably 1 to 10 mol, based on 1 mol of the titanium atom contained in the solid titanium catalyst component [A-1].

The prepolymerization is carried out preferably under mild conditions by adding olefin or higher α-olefin and the catalyst for olefin polymerization to an inert hydrocarbon medium.

Concrete examples of the inert hydrocarbon medium used herein include aliphatic hydrocarbons such as propane, butane, pentane, hexane, heptane, octane, decane, dodecane and kerosine; alicyclic hydrocarbons such as cyclopentane, cyclohexane and methylcyclopentane; aromatic hydrocarbons such as benzene, toluene and xylene; halogenated hydrocarbons such as ethylene chloride and chlorobenzene; and mixtures of these hydrocarbons. Of these inert hydrocarbon media, aliphatic hydrocarbons are particularly preferably employed. Olefin or higher α-olefin itself may be prepolymerized in a solvent or may be prepolymerized in a state where a solvent does not substantially exist.

The higher α-olefin used in the prepolymerization may be the same or different from the higher α-olefin used in the later-described polymerization.

The reaction temperature in the prepolymerization is usually in the range of about $-20°$ to $+100°$ C., preferably about $-20°$ to $+80°$ C., more preferably $0°$ to $+40°$ C.

A molecular weight regulator such as hydrogen can be used in the prepolymerization. The molecular weight regulator is desirably used in such an amount that a polymer obtained by the prepolymerization would have an intrinsic viscosity [η], as measured in decalin at 135° C., of not less than about 0.2 dl/g, preferably in the range of about 0.5 to 10 dl/g.

The prepolymerization can be carried out either batchwise or continuously.

In the presence of a catalyst for olefin polymerization comprising the solid titanium catalyst component [A-1] (or the solid titanium catalyst component [A-1] obtained by the prepolymerization on a catalyst for olefin polymerization as described above), the organoaluminum compound catalyst component [B] and the electron donor catalyst component [C], copolymerization (polymerization) of the higher α-olefin, the α,ω-diene and the non-conjugated diene is carried out.

When the copolymerization is carried out after the prepolymerization, a component similar to the organometallic compound catalyst component [B] used for preparing the catalyst for olefin polymerization may be used as an organometallic compound catalyst compound, in addition to the prepolymerized catalyst. Further, when the copolymerization is carried out after the prepolymerization, a component similar to the electron donor catalyst component [C] used for preparing the catalyst for olefin polymerization may be used in the copolymerization as an electron donor catalyst component. The organoaluminum compound and the electron donor employable in the copolymerization of the higher α-olefin, the α,ω-diene and the non-conjugated diene are not always the same as those used for preparing the above-mentioned catalyst for olefin polymerization.

The copolymerization of the higher α-olefin, the α,ω-diene and the non-conjugated diene is generally carried out in a liquid phase.

As the reaction medium (diluent), the aforementioned inert hydrocarbon medium may be used, or an olefin which is liquid at a reaction temperature may be used.

In the copolymerization of the higher α-olefin, the α,ω-diene and the non-conjugated diene, the solid titanium catalyst component [A-1] is used generally in an amount of about 0.001 to about 1.0 mmol, preferably about 0.005 to 0.5 mmol, in terms of titanium atom, based on 1 liter of the polymerization volume. The organometallic compound catalyst component [B] is used generally in such an amount that the metal atom contained in the organoaluminum compound catalyst component would be generally in the range of about 1 to 2,000 mol, preferably about 5 to 500 mol, based on 1 mol of the titanium atom contained in the solid titanium catalyst component [A-1]. The electron donor catalyst component [C] is used generally in an amount of about 0.001 to 10 mol, preferably 0.01 to 2 mol, more preferably 0.05 to 1 mol, based on 1 mol of the metal atom contained in the organometallic compound catalyst component [B].

In this copolymerization, hydrogen may be used to regulate the molecular weight of the resulting copolymer.

The temperature for the polymerization of the higher α-olefin, the α,ω-diene and the non-conjugated diene in the invention is usually in the range of about 20° to 200° C., preferably about 40° to 100° C., and the pressure therefor is usually in the range of an atmospheric pressure to 100 kg/cm², preferably an atmospheric pressure to 50 kg/cm². The copolymerization of the higher α-olefin, the α,ω-diene and the non-conjugated diene may be carried out either batchwise, semi-continuously or continuously. Further, the copolymerization may be carried out in two or more steps having reaction conditions different from each other.

The higher α-olefin copolymer of the invention obtained by the above-mentioned polymerization is excellent not only in dynamic fatigue resistance (flexural fatigue resistance), weathering resistance, ozone resistance, thermal aging resistance and low-temperature characteristics but also in processability. Especially when this copolymer is applied to resin modifiers and various rubber products, its excellent properties are exhibited with maximum level.

The higher α-olefin copolymer of the invention can be used as a resin modifier, for example, a modifier for polypropylene, polyethylene, polybutene, polystyrene and an ethylene/cycloolefin copolymer. When the higher α-olefin copolymer of the invention is added to those resins, impact resistance and stress cracking resistance of the resins can be remarkably improved.

Various rubber products are generally used in the vulcanized form, and when the higher α-olefin copolymer of the invention is used in the vulcanized form, its characteristics are exhibited. In the case where the higher α-olefin copolymer of the invention is used for various rubber products, a vulcanized product of this copolymer can be prepared by first preparing an unvulcanized rubber composition, and then molding the rubber composition into the desired form, followed by vulcanization thereof, in the same manner as that for conventional vulcanization of general rubbers.

For vulcanizing the molded rubber composition, either a method of using a vulcanizing agent and heating the rubber composition or a method of irradiating the rubber composition with electron rays may be utilized.

As the vulcanizing agent used for the vulcanization, sulfur type compounds and organic peroxides can be mentioned.

Concrete examples of the sulfur type compounds include sulfur, sulfur chloride, sulfur dichloride, morpholine disulfide, alkylphenol disulfide, tetramethylthiuram disulfide and selenium dimethyldithiocarbamate. Of these, sulfur is preferably employed. The sulfur type compound is used in an amount of 0.1 to 10 parts by weight, preferably 0.5 to 5 parts by weight, based on 100 parts by weight of the higher α-olefin copolymer of the invention.

As the organic peroxide, employable are those used for conventional peroxide vulcanization of general rubbers. Examples the organic peroxides preferably used include dicumyl peroxide, di-t-butyl peroxide, di-t-butyl peroxy-3,3,5-trimethylcyclohexane, t-butyl hydroperoxide, t-butylcumyl peroxide, benzoyl peroxide, 2,5-dimethyl-2,5-di(t-butylperoxy)hexyne-3,2,5-dimethyl-2,5-di(benzoylperoxy)hexane, 2,5-dimethyl-2,5-mono (t-butylperoxy) hexane, α, α′-bis(t-butylperoxy-m-isopropyl)benzene. Of these, preferably used are dicumyl peroxide, di-t-butyl peroxide and di-t-butylperoxy-3,3,5-trimethylcyclohexane. These organic peroxides are used singly or in combination of two or more kinds. The organic peroxide is used in an amount of 0.0003 to 0.05 mol, preferably 0.001 to 0.03 mol, based on 100 g of the higher α-olefin copolymer, and it is desired that the most appropriate amount is determined depending on the physical property values required.

When the sulfur type compound is used as the vulcanizing agent, a vulcanization accelerator is preferably used in combination.

Concrete examples of the vulcanization accelerator include:

thiazole type compounds such as N-cyclohexyl-2-benzothiazolesulfenamide, N-oxydiethylene-2-benzothiazolesulfenamide, N,N-diisopropyl-2-benzothiazolesulfenamide, 2-mercaptobenzothiazole, 2-(2,4-dinitrophenyl)mercaptobenzothiazole, 2(2,6-diethyl-4-morpholinothio)benzothiazole and dibenzothiazyldisulfide;

guanidine compounds such as diphenylguanidine, triphenylguanidine, diorthonitrileguanidine, orthonitrilebiguanide and diphenylguanidine phthalate;

aldehyde/ammonia type compounds such as acetaldehyde/aniline reaction product, butylaldehyde/aniline condensation product, hexamethylenetetramine and acetaldehyde ammonia;

imidazoline type compounds such as 2-mercaptoimidazoline;

thiourea type compounds such as thiocarbanilide, diethylthiourea, dibutylthiourea, trimethylthiourea and diorthotolylthiourea;

thiuram type compounds such as tetramethylthiuram monosulfide, tetramethylthiuram disulfide, tetraethylthiuram disulfide, tetrabutylthiuram disulfide and pentamethylenethiuram tetrasulfide;

dithio acid salt type compounds such as zinc dimethyldithiocarbamate, zinc diethyldithiocarbamate, zinc di-n-butyldithiocarbamate, zinc ethylphenyldithiocarbamate, zinc butylphenyldithiocarbamate, sodium dimethyldithiocarbamate, selenium dimethyldithiocarbamate and tellurium dimethyldithiocarbamate;

xanthate type compounds such as zinc dibutyl xanthate; and other compounds such as zinc white.

The vulcanization accelerator is used in an amount of 0.1 to 20 parts by weight, preferably 0.2 to 10 parts by weight, based on 100 parts by weight of the higher α-olefin copolymer.

When the organic peroxide is used as the vulcanizing agent, a vulcanization assisting agent is preferably used in combination. Concrete examples of the vulcanization assisting agent include sulfur; quinone dioxime type compounds such as p-quinonedioxime, methacrylate type compounds such as polyethylene glycol dimethacrylate; allyl type compounds such as diallylphthalate and triallylcyanurate; maleimide type compounds; and divinylbenzene. The vulcanization assisting agent is used in an amount of 0.5 to 2 mol, preferably about 1 mol, based on 1 mol of the organic peroxide used.

In the case where the vulcanization is carried out not using the vulcanizing agent but using electron rays, the later-described unvulcanized molded rubber composition is irradiated with electron rays having energy of 0.1 to 10 MeV (mega-electronvolt), preferably 0.3 to 2 MeV, so that the ray-absorption amount is 0.5 to 35 Mrad (megarad), preferably 0.5 to 10 Mrad.

In this case, the vulcanization assisting agent may be used in combination with an organic peroxide which is the vulcanizing agent, and the amount of the organic peroxide used herein is in the range of 0.0001 to 0.1 mol, preferably 0.001 to 0.03 mol, based on 100 g of the higher α-olefin copolymer.

The unvulcanized rubber composition is prepared by the following process. That is, the higher α-olefin copolymer, a filler, a softening agent are kneaded in a mixing device such as a Banbury mixer at a temperature of 80° to 170° C. for 3 to 10 minutes, then to the resulting kneadate is added the vulcanizing agent and if necessary the vulcanization accelerator or vulcanization assisting agent, and the resulting mixture is milled at a temperature of 40° to 80° C. for 5 to 30 minutes using a roll such as an open milling roll. Thereafter, the resulting mixture is rolled to prepare a rubber composition in the form of a ribbon or a sheet. As described above, a rubber composition using the higher α-olefin copolymer of the invention, namely a vulcanizable rubber composition, is prepared by mixing each components by means of mixing devices conventionally used in the ordinary rubber industry, such as a roll, a Banbury mixer and a kneader. Further, the above-mentioned components may be appropriately mixed other various additives which are used in the ordinary rubber industry, such as reinforcing agents (e.g., carbon black and silica), fillers (e.g., calcium carbonate and talc), crosslinking assisting agents (e.g., triallylisocyanurate, trimethylolpropane triacrylate and m-phenylenebismaleimide), plasticizers, stabilizers, processing aids, and colorants.

The rubber composition prepared as above is then molded into the desired form using an extrusion molding machine, a calender roll or a press. Vulcanization of the rubber composition is carried out simultaneously with the above-mentioned molding procedure or thereafter. That is, the rubber composition or its molded product is introduced into a vulcanizing vessel and vulcanized therein by heating it at a temperature of 150° to 270° C. for 1 to 30 minutes or by irradiating it with electron rays in the manner mentioned before, to obtain a vulcanized product. The vulcanization process may be carried out using a mold, or may be carried out not using a mold. When a mold is not used, the molding procedure and vulcanization procedure are generally conducted continuously. For conducting the heating in the vulcanizing vessel, the vessel is heated using hot air, glass bead fluidized bed, UHF (ultrahigh frequency electromagnetic wave), steam, etc. As a matter of course, when vulcanization using irradiation with electron rays is carried out, a rubber composition containing no vulcanizing agent is used.

The vulcanized rubber product prepared as above can be per se used as automotive industrial part such as vibration insulator, wiper blade, tire and cover material for vibrating portion; industrial rubber product such as rubber roll and belt, electrical insulator; civil engineering and building material; rubberized fabric; etc. When a foaming agent is added to the aforementioned unvulcanized rubber to foam the rubber under heating, a foamed material can be obtained, and this foamed material can be used as heat insulating material, cushioning material, sealing material, etc.

Next, the vibration-insulating rubber molded product of the present invention is described below.

The vibration-insulating rubber molded product of the invention is formed from the above-mentioned vulcanized product of the higher α-olefin copolymer, but it may further contain an assisting agent used for the vulcanization reaction, for example, a metal activator, a compound having oxymethylene structure and a scorch retarder. Further, when to the vibration-insulating rubber molded product of the invention are added additives such as reinforcing agent for rubber, filler, softening agent, aging inhibitor and processing aid, the performance of the vibration-insulating rubber molded product can be much more improved. Accordingly, the above-mentioned additives are preferably used in the invention.

The vibration-insulating rubber molded product of the invention can be prepared, for example, by the following process.

That is, to the higher α-olefin copolymer described as above is added a vulcanizing agent to vulcanize the copolymer, so as to obtain the vibration-insulating rubber molded product of the invention.

As described above, the vulcanization is carried out by adding a vulcanizing agent to the higher α-olefin copolymer, and addition of the vulcanizing agent is preferably made prior to a molding procedure. Effective methods for vulcanizing the higher α-olefin copolymer are sulfur vulcanization and organic peroxide vulcanization.

Concrete examples of sulfur type compounds used for the sulfur vulcanization and organic peroxides used for the organic peroxide vulcanization, and amounts thereof are the same as those described before.

The vulcanizing agent is preferably used in combination with a vulcanization accelerator. Concrete examples of the vulcanization accelerator and an amount thereof are the same as those described before.

In the preparation of the vibration-insulating rubber molded product of the invention, a vulcanization assisting agent such as a metal activator, a compound having oxymethylene structure or a scorch retarder is preferably used in addition to the above-mentioned vulcanizing agent and vulcanization accelerator.

Concrete examples of the metal activator include magnesium oxide, zinc white, zinc carbonate, zinc higher aliphatic acid, minium, litharge and calcium oxide. The metal activator is used in an amount of 3 to 15 parts by weight, preferably 5 to 10 parts by weight, based on 100 parts by weight of the higher α-olefin copolymer.

It is desired that a compound having oxymethylene structure and a scorch retarder are added for coping with various processing procedures.

Concrete examples of the compound having oxymethylene structure employable in the invention include ethylene glycol, diethylene glycol, polyethylene glycol, propylene glycol and polypropylene glycol. The compound having oxymethylene structure is used in an amount of 0.1 to 10 parts by weight, preferably 1 to 5 parts by weight, based on 100 parts by weight of the higher α-olefin copolymer.

Employable as the scorch retarder are known scorch retarders, and concrete examples thereof include maleic anhydride and salicylic acid. The scorch retarder is used in an amount of 0.2 to 5 parts by weight, preferably 0.3 to 3 parts by weight, based on 100 parts by weight of the higher α-olefin copolymer.

The performance of the vibration-insulating rubber molded product can be much more improved by adding thereto additives such as reinforcing agent for rubber, filler, softening agent, aging inhibitor and processing aid, as described above. These additives may be appropriately mixed with the higher α-olefin copolymer prior to the vulcanization or thereafter.

Concretely, there can be used as the additives reinforcing agents such as carbon black (e.g., SRF, GPF, FEF, HAF, ISAF, SAF, FT and MT) and finely-ground silicate; and fillers such as precipitated calcium carbonate light, heavy calcium carbonate, talc, clay and silica. The amount and kind of the rubber reinforcing agent or the filler used can be appropriately determined depending on the purpose of the resulting vibration-insulating rubber molded product, and the amount thereof is generally at most 300 parts by weight, preferably at most 200 parts by weight, based on 100 parts by weight of the higher α-olefin copolymer.

As the softening agents, those generally used for rubbers can be employed. Concrete examples thereof include petroleum type softening agents such as process oil, lubricating oil, paraffin, liquid paraffin, petroleum asphalt and vaseline; coal tar type softening agents such as coal tar and coal tar pitch; aliphatic oil type softening agents such as castor oil, linseed oil, rapeseed oil and coconut oil; tall oil; factice; waxes such as beewax, carnauba wax and lanolin; aliphatic acids and aliphatic salts such as ricinolic acid, palmitic acid, barium stearate, calcium stearate and zinc laurate; and synthetic polymer materials such as petroleum resin, atactic polypropylene and coumarone-indene resin. Of these, petroleum type softening agents are preferably used, and among therefrom, process oil is preferably used. The amount of the softening agent used can be appropriately determined depending on the purpose of the resulting vulcanized product, and the amount thereof is generally at most 150 parts by weight, preferably at most 100 parts by weight, based on 100 parts by weight of the higher α-olefin copolymer.

As the aging inhibitors, those generally used for rubbers can be employed, and the amount of the aging inhibitor used is in the range of 0.1 to 5 parts by weight, preferably 0.5 to 3 parts by weight, based on 100 parts by weight of the higher α-olefin copolymer.

As the processing aids, those generally used for rubbers can be employed, and the amount of the processing aid used is not more than 10 parts by weight, preferably in the range of 1 to 5 parts by weight, based on 100 parts by weight of the higher α-olefin copolymer.

In addition, other kinds of rubbers such as natural rubber, diene type rubber (e.g., SBR, IR and BR) and EPDM may be added to a composition for preparing the vibration-insulating rubber molded product in the invention.

The vibration-insulating rubber molded product of the invention can be obtained by preparing a rubber composition and molding the composition, for example, in the following manner. That is, the higher α-olefin copolymer and if necessary additives such as reinforcing agent, filler and softening agent are kneaded in a mixing device such as a Banbury mixer at a temperature of 80° to 170° C. for 3 to 10 minutes, then to the resulting kneadate is added the vulcanizing agent and if necessary the vulcanization accelerator and the vulcanizing assisting agent, and the mixture is milled using rolls such as open milling rolls at a roll temperature of 40° to 80° C. for 5 to 30 minutes. Thereafter, the resulting mixture is rolled to prepare a rubber composition in the form of a ribbon or a sheet.

The rubber composition thus obtained is then subjected to molding and vulcanizing by the use of a press molding machine, a transfer molding machine, an injection molding machine, etc., to give a vibration-insulating rubber molded product.

The vibration-insulating rubber molded product obtained as above is often used as its composite with iron. In the case where the vibration-insulating rubber molded product of the invention is required to be adhered to iron, commercially available adhesives can be used, whereby sufficient adhesion between the vibration-insulating rubber molded product and iron can be obtained. Of various commercially available adhesives, Chemrock 250, 253, etc. available from Road Far East Co. are favorably used.

The vibration-insulating rubber molded product prepared as above is excellent not only in thermal aging resistance but also in dynamic fatigue resistance (flexural fatigue resistance).

Next, a rubber belt molded product, a wiper blade rubber molded product and a rubber molded product for roll, all being molded products made of the higher α-olefin copolymer of the invention, are described below.

These molded products are preferably prepared, for example, by the following process.

That is, these products are obtained by adding a vulcanizing agent to the above-mentioned α-olefin copolymer so as to vulcanize the copolymer.

A process for preparing rubber compositions for those products and various additives employable for the preparation such as a vulcanizing agent are the same as those described before with respect to the vibration-insulating rubber molded product.

In detail, the higher α-olefin copolymer and if necessary additives such as a reinforcing agent, a filler and a softening agent are kneaded using a mixing device such as a Banbury mixer at a temperature of 80° to 170° C. for about 3 to 10 minutes. Thereafter, to the resulting mixture are added a vulcanizing agent and if necessary a vulcanization accelerator and a vulcanization assisting agent and they are milled using rolls such as open milling rolls at a roll temperature of 40° to 80° C. for 5 to 30 minutes, and then the mixture is rolled to prepare a rubber composition in the form of a ribbon or a sheet.

In the case of the rubber belt molded product and the wiper blade rubber molded product, the rubber composition in the form of pellets may be prepared by directly feeding the higher α-olefin copolymer and the additives into an extruder which is heated to about 80° to 100° C. and setting the residence time to about 0.5 to 5 minutes.

The rubber belt molded product can be obtained by molding the rubber composition prepared as above to give a molded product in the form of a belt generally using a rolling machine, a calendering machine, an extruder or the like and then vulcanizing the molded product under heating at a temperature of 130° to 220° C. for 1 to 60 minutes.

Further, the rubber belt molded product can be also obtained by subjecting the above-mentioned rubber composition to molding and vulcanizing within a mold using a press molding machine or an injection molding machine. In this case, the mold temperature is generally in the range of 130° to 220° C. and the period of time required for the vulcanization is in the range of 1 to 60 minutes.

The rubber belt molded product thus obtained may be combined with a reinforcing material such as synthetic fabric, natural fabric, steel cord or glass cord to prepare a composite type rubber belt.

The rubber belt molded product prepared as above is excellent in thermal aging resistance and dynamic fatigue resistance (flexural fatigue resistance), and has a small change of elastic modulus in a wide temperature range of from a low temperature to a high temperature.

The wiper blade rubber molded product can be obtained by subjecting the above-prepared rubber composition to molding and vulcanizing generally using a press molding machine, a transfer molding machine, an injection molding machine or the like.

The wiper blade rubber molded product is prepared by using the rubber composition singly as described above, but the rubber composition may be laminated with a material conventionally used to obtain a wiper blade rubber molded product of composite type having a longer life. Further, the wiper blade rubber molded product obtained as above may be subjected to a surface treatment such a chlorination, bromination or fluorination, or the surface thereof may be coated with a resin such as polyethylene or filled with short fibers, to reduce the friction coefficient, whereby performance of the wiper blade rubber molded product can be much more improved.

The rubber molded product for roll can be prepared by the following process. The above-mentioned rubber composition is rolled generally using a rolling machine, a calendering machine, an extruder or the like, and thus rolled rubber composition is wound up around a metallic core coated with an adhesive to give a roll of the rubber composition. Then, the roll is tightly wound up with a cloth helically, and both ends of the roll are applied with appropriate boards. Depending on cases, a wire may be densely wound up over the above cloth. The thus treated roll is then placed in a vulcanizer and heated at 130° to 220° C. to vulcanize the roll. After the vulcanized roll is completely cooled, the cloth and the wire are removed from the roll, and the roll is subjected to mechanical abrasive finishing.

The rubber molded product for roll obtained as above is excellent in both of thermal aging resistance and dynamic fatigue resistance (flexural fatigue resistance), and has a small change of elastic modulus within a wide temperature range of from a low temperature to a high temperature.

EFFECT OF THE INVENTION

The higher α-olefin copolymer of the invention contains specific higher α-olefin, specific α,ω-diene and specific non-conjugated diene in a specific ratio therebetween, and has an intrinsic viscosity $[\eta]$ of specific value. Accordingly, this higher α-olefin copolymer is excellent not only in weathering resistance, ozone resistance, thermal aging resistance, low-temperature characteristics, vibration-damping properties and dynamic fatigue resistance but also in processability. Further because of these properties, an excellent vulcanized product can be obtained from the higher α-olefin copolymer.

According to the process of the invention for preparing higher α-olefin copolymer, a higher α-olefin copolymer having such excellent properties as mentioned above can be efficiently prepared in a high yield.

The vibration-insulating rubber molded product of the invention is formed from a vulcanized product of a copolymer which comprises specific higher α-olefin, specific α,ω-diene and specific non-conjugated diene, and hence the vibration-insulating rubber molded product is excellent in both of thermal aging resistance and dynamic fatigue resistance and has a long life.

According to the process of the invention for preparing vibration-insulating rubber molded product, a vibration-insulating rubber molded product having the above-mentioned excellent properties can be obtained.

The rubber belt molded product according to the invention is formed from a vulcanized product of the above-mentioned higher α-olefin copolymer, and hence it is excellent in both of thermal aging resistance and dynamic fatigue resistance and has a small change of elastic modulus within a wide temperature range of from a low temperature to a high temperature.

The wiper blade rubber molded product according to the invention is formed from a vulcanized product of the above-mentioned higher α-olefin copolymer, and hence it is excellent not only in environmental aging resistance (thermal aging resistance, weathering resistance and ozone resistance) but also in dynamic fatigue resistance (flexural fatigue resistance) and has a long life.

The rubber molded product for roll according to the invention is formed from a vulcanized product of the above-mentioned higher α-olefin copolymer, and hence it is excellent in abrasion resistance, thermal aging resistance and permanent compression set characteristics and has a low hardness such as a hardness of not more than 37 in terms of JIS A hardness.

The present invention is illustrated below with reference to examples, but it should be construed that the invention is in no way limited to those examples.

Example 1

[Preparation of solid titanium catalyst component [A-1]

95.2 g of magnesium chloride anhydride, 442 ml of decane and 390.6 g of 2-ethylhexyl alcohol were mixed with each other under heating at 130° C. for 2 hours to give a homogeneous solution. Then, to the solution was added 21.3 g of phthalic anhydride, and they were mixed with each other at 130° C. for 1 hour to dissolve the phthalic anhydride in the homogeneous solution. The resulting homogeneous solution was cooled to a room temperature, and then 75 ml of the solution was dropwise added over 1 hour to 200 ml of titanium tetrachloride kept at −20° C. After the addition was completed, the temperature of the resulting mixture liquid was elevated to 110° C. over 4 hours. When the temperature of the mixture liquid reached 110° C., 5.22 g of diisobutyl phthalate was added to the mixture liquid. Then, the mixture liquid was stirred for 2 hours at the same temperature. After the 2-hour reaction was completed, the mixture liquid was subjected to hot filtration to collect a solid portion. This solid portion was suspended in 275 ml of titanium tetrachloride, and the resulting suspension was heated at 110° C. for 2 hours to conduct a reaction. After completion of the reaction, the suspension was again subjected to hot filtration to collect a solid portion. This solid portion was sufficiently washed with decane of 110° C. and hexane until any titanium compound liberating in the washing liquid was not detected. The titanium catalyst component [A-1] prepared through the above operation was stored as its decane slurry, though a part of the component [A-1] was dried for the purpose of examination of the catalyst composition. The solid titanium catalyst component [A-1] obtained as above had a composition essentially consisting of 2.5% by weight of titanium, 65% by weight of chlorine, 19% by weight of magnesium and 13.5% by weight of diisobutylphthalate.

Polymerization

Copolymerization of octene-1, 1,5-hexadiene and 7-methyl-1, 6-octadiene was continuously carried out using a 4-liter glass polymerizer equipped with a stirring blade.

That is, to the polymerizer were continuously fed from the top thereof a hexane solution of octene-1,1,5-hexadiene and 7-methyl-1,6-octadiene at a feed rate of 2.1 l/hr so that the concentration of octene-1 in the polymerizer was 200 g/l, the concentration of 1,5-hexadiene in the polymerizer was 39 g/l and the concentration of 7-methyl-1,6-octadiene was 10 g/l, a hexane solution of the solid titanium catalyst component [A-1] as a catalyst at a feed rate of 0.4 l/hr so that the concentration of titanium in the polymerizer was 0.045 mmol/l, a hexane solution of triisobutylaluminum at a feed rate of 1 l/hr so that the concentration of aluminum in the polymerizer was 8 mmol/l, and a hexane solution of trimethylmethoxysilane at a feed rate of 0.5 l/hr so that the concentration of silane in the polymerizer was 2.6 mmol/l. At the same time, the resulting polymerization solution was continuously drawn out from the bottom of the polymerizer so that the amount of the polymerization solution in the polymerizer was constantly 2 liters. Further, to the polymerizer were continuously fed from the top thereof hydrogen at a feed rate of 1 l/hr and nitrogen at a feed rate of 50 l/hr. The copolymerization reaction was carried out at 50° C. by circulating hot water within a jacket equipped with outside of the polymerizer.

Subsequently, to the polymerization solution drawn out from the bottom of the polymerizer was added a small amount of methanol to terminate the copolymerization reaction, and the polymerization solution was introduced into a large amount of methanol to precipitate a copolymer. The copolymer was well washed with methanol and then dried at 140° C., for 24 hours under a reduced pressure, to obtain an octene-1/1,5-hexadiene/7-methyl-1,6-octadiene copolymer at a rate of 90 g/hr.

The copolymer thus obtained had a molar ratio of octene-1 to 1,5-hexadiene (octene-1/1,5-hexadiene) of 68/32, an iodine value of 7.7, and an intrinsic viscosity [η], as measured in decahydronaphthalene at 135° C. of 4.8 dl/g

EXAMPLES 2-6

The procedure of Example 1 was repeated except for varying the higher α-olefin and the polymerization conditions to those set forth in Table 1, to prepare copolymers set forth in Table 1.

From the results obtained by $^{13}$C-NMR analysis, it has been found that repeating unit derived from the 1,5-hexadiene component forms a cyclic structure represented by the following formula. Further, trace of peaks based on the terminal double bonds has been also found, and from the intensities of the peaks, it has been confirmed that not less than 99% of the repeating units forms the cyclic structure.

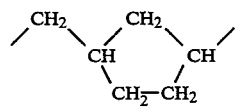

Peaks on the $^{13}$C-NMR spectrum of the hexene-1/1,5-hexadiene/ 7-methyl-1,6-octadiene copolymer, each based on deuterated benzene (128.0 ppm), are as follows.

No. Chemical shift [ppm]
1. 30.9–32.9
2. 33.6–34.1
3. 38.4
4. 39.8–39.9
5. 40.1–41.0

6. 42.5–42.7
7. 44.3–44.4
8. 40.5–44.4
9. 40.5–43.0
10. 33.7–35.1
11. 36.3
12. 37.0–37.1
13. 38.4
14. 35.3
15. 29.3–29.4
16. 23.5–23.6
17. 14.3
18. 27.1–27.3
19. 135.2
20. 124.0–124.5
21. 14.3
22. 17.9
23. 140
24. 115

In the following formulas, C represents cis form and T represents trans form.

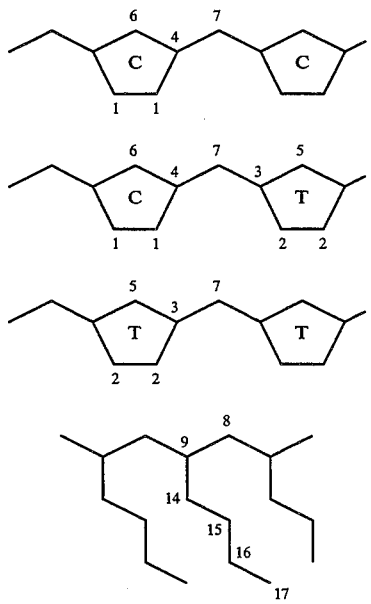

-continued

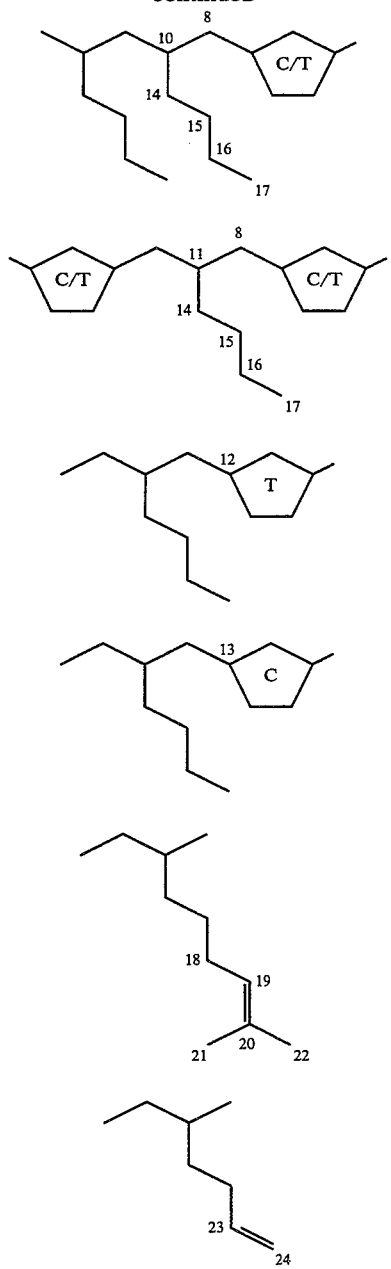

TABLE 1

| | Ti Concentration mmol/l | Al Concentration mmol/l | Third Component | mmol/l | Hydrogen l/hr | Nitrogen l/hr | Higher α-olefin (a) | g/l | α,ω-diene (b) | g/l |
|---|---|---|---|---|---|---|---|---|---|---|
| Ex. 1 | 0.04 | 8.0 | TMMS | 2.6 | 1 | 50 | Octene-1 | 200 | HexD | 39 |
| Ex. 2 | 0.05 | 7.5 | TMMS | 1.5 | 3 | 50 | Octene-1 | 143 | HexD | 28 |
| Ex. 3 | 0.05 | 7.5 | TMMS | 2.5 | 3 | 50 | Hexene-1 | 138 | HexD | 14 |
| Ex. 4 | 0.04 | 8.0 | TMMS | 2.6 | 1 | 50 | Hexene-1 | 190 | HexD | 39 |
| Ex. 5 | 0.04 | 6.0 | TMES | 2.0 | 1 | 50 | Hexene-1 | 162 | RexD | 35 |
| Ex. 6 | 0.04 | 8.0 | TMMS | 2.6 | 1 | 50 | Decene-1 | 178 | HepD | 33 |
| Comp. Ex. 1 | 0.03 | 3.0 | TMMS | 1.0 | 5 | 50 | Octene-1 | 122 | — | — |

| | MOD g/l | Yield g/hr | (a) / (b) mol/mol | MOD mol % | [η] dl/g |
|---|---|---|---|---|---|
| Ex. 1 | 10 | 90 | 68/32 | 3.1 | 4.8 |
| Ex. 2 | 4 | 85 | 66/34 | 1.9 | 4.3 |
| Ex. 3 | 3 | 170 | 84/16 | 1.4 | 4.2 |
| Ex. 4 | 10 | 75 | 57/43 | 2.7 | 5.4 |

TABLE 1-continued

| | | | | | |
|---|---|---|---|---|---|
| Ex. 5 | 8 | 140 | 79/21 | 2.5 | 5.3 |
| Ex. 6 | 9 | 200 | 73/27 | 3.6 | 4.9 |
| Comp. Ex. 1 | 3 | 100 | 100/0 | 2.9 | 4.4 |

TMMS: trimethylmethoxysilane
HexD: 1,5-hexadiene
MOD: 7-methyl-1,6-octadiene
TMES: trimethylethoxysilane
HepD: 1,6-heptadiene

EXAMPLE 7

The octene-1/1,5-hexadiene/7-methyl-1,6-octadiene copolymer prepared in Example 1 was milled with additives set forth in Table 2 using 8-inch open milling rolls, to obtain an unvulcanized rubber composition. The unvulcanized rubber composition was evaluated on the processability. The result is set forth in Table 3.

TABLE 2

| Composition | Amount [part(s) by weight] |
|---|---|
| Copolymer | 100 |
| Stearic acid | 1 |
| Zinc white | 5 |
| ISAF carbon 1) | 50 |
| Vulcanization accelerator 2) | 0.5 |
| Vulcanization accelerator 3) | 0.2 |
| Sulfur | 0.3 |

1) Trade name: Asahi 80, available from Asahi Carbon K.K.
2) Trade name: Sunseller M, available from Sanshin Kagaku K.K.
3) Trade name: Sunseller TT, available from Sanshin Kagaku K.K.

Further, the above-mentioned rubber composition was heated for 20 minutes by means of a press heated to 160° C. to prepare a vulcanized sheet. The vulcanized sheet was subjected to the following tests. The test items are as follows.

Test items

Tensile test, hardness test, ozone resistance test, aging test, flexural test, and low-temperature characteristics test.

Test method

The tensile test, hardness test, ozone resistance test, aging test and flexural test were carried out in accordance with JIS K 6301.

That is, tensile strength ($T_B$) and elongation ($E_B$) were measured in the tensile test, and JIS A hardness ($H_s$) was measured in the hardness test.

The ozone resistance test was conducted in an ozone testing vessel (static test, ozone concentration: 50 pphm, elongation rate: 20%, temperature: 40° C., time: 200 hours), and the vulcanized sheet was examined on the surface deterioration (presence or absence of crack occurrence).

The aging test was conducted by heating the vulcanized sheet with hot air of 120° C. for 70 hours. In this test, retentions of physical properties of the vulcanized sheet before aging, that is, retention of tensile strength $A_R(T_B)$ and retention of elongation $A_R(E_B)$, were measured.

In the flexural test, resistance to crack growth was examined by means of de Mattia machine. That is, the vulcanized sheet was repeatedly flexed until a length of a crack reached 15 mm, and the number of flexure times was measured.

The low-temperature characteristics were examined by a brittleness test in accordance with JIS K 6301, and in this test, the brittle temperature was measured.

The results are set forth in Table 3.

EXAMPLE 8

The procedure of Example 7 was repeated except for using the octene-1/1,5-hexadiene/7-methyl-1,6-octadiene copolymer prepared in Example 2 instead of the octene-1/1,5-hexadiene/7-methyl-1,6-octadiene copolymer prepared in Example 1.

The results are set forth in Table 3.

EXAMPLE 9

The procedure of Example 7 was repeated except for using the hexene-1/1,5-hexadiene/7-methyl-1,6-octadiene copolymer prepared in Example 3 instead of the octene-1/1,5-hexadiene/7-methyl-1,6-octadiene copolymer prepared in Example 1.

The results are set forth in Table 3.

EXAMPLE 10

The procedure of Example 7 was repeated except for using the hexene-1/1,5-hexadiene/7-methyl-1,6-octadiene copolymer prepared in Example 4 instead of the octene-1/1,5-hexadiene/7-methyl-1,6-octadiene copolymer prepared in Example 1.

The results are set forth in Table 3.

EXAMPLE 11

The procedure of Example 7 was repeated except for using the hexene-1/1,5-hexadiene/7-methyl-1,6-octadiene copolymer prepared in Example 5 instead of the octene-1/1,5-hexadiene/7-methyl-1,6-octadiene copolymer prepared in Example 1.

The results are set forth in Table 3.

EXAMPLE 12

The procedure of Example 7 was repeated except for using the decene-1/1,6-heptadiene/7-methyl-1,6-octadiene copolymer prepared in Example 6 instead of the octene-1/1,5-hexadiene/7-methyl-1, 6-octadiene copolymer prepared in Example 1.

The results are set forth in Table 3.

Comparative Example 1

The procedure of Example 1 was repeated except for not using 1,5-hexadiene and carrying out copolymerization under the polymerization conditions set forth in Table 1, to prepare an octene-1/7-methyl-1,6-octadiene copolymer.

Subsequently, the procedure of Example 7 was repeated except for using the octene-1/7-methyl-1,6-octadiene copolymer obtained in the above instead of the octene-1/1,5-hexadiene/7-methyl-1,6-octadiene copolymer obtained in Example 1.

The results are set forth in Table 3.

TABLE 3

|  | Ex. 7 | Ex. 8 | Ex. 9 | Ex. 10 | Ex. 11 | Ex. 12 | Comp. Ex. 1 |
|---|---|---|---|---|---|---|---|
| $T_B$ [kg/cm$^2$] | 135 | 130 | 125 | 135 | 120 | 125 | 125 |
| $E_B$ [%] | 650 | 670 | 750 | 700 | 750 | 730 | 580 |
| Ozone resistance (occurrence of carck) | None | None | None | None | None | None | None |
| Hs | 52 | 52 | 50 | 55 | 51 | 55 | 50 |
| $A_R$ ($T_B$) [%] | 95 | 90 | 92 | 93 | 92 | 90 | 90 |
| $A_R$ ($E_B$) [%] | 80 | 82 | 80 | 81 | 81 | 82 | 80 |
| Flexural test (number of times to crack growth) | >10$^5$ | >10$^5$ | >10$^5$ | >10$^5$ | >10$^5$ | >10$^5$ | >10$^5$ |
| Brittle temperature [°C] | <−50 | <−50 | <−50 | <−50 | <−50 | <−50 | <−50 |
| Processability (Note 1) | 5 | 5 | 5 | 5 | 5 | 5 | 1 |

(Note 1) Evaluation on processability (5-class evaluation):

1  2  3  4  5

Bad ←         → Good

5: Cutting, tailing and rounding of the vulcanized sheet are easily made in the roll milling procedure.
4: Cutting of the vulcanized sheet is difficult, but tailing and rounding thereof are easily made in the roll milling procedure.
3: Cutting and tailing of the vulcanized sheet are difficult, but rounding thereof is easily made in the roll milling procedure.
2: Cutting and tailing of the vulcanized sheet are difficult, but rounding thereof is made in the roll milling procedure.
1: Cutting, tailing and rounding of the vulcanized sheet are all difficult in the roll milling procedure.

EXAMPLE 13

80 parts by weight of polypropylene (J700 available from Mitsui Petrochemical Industries, Ltd.), 20 parts by weight of the octene-1/1,5-hexadiene/7-methyl-1,6-octadiene copolymer prepared in Example 1 and 0.1 part by weight of 2,6-di-t-butyl-4-methylphenol were kneaded with each other using a Banbury mixer at 190° C. for 3 minutes, and the resulting kneadate was rolled into a sheet using open milling rolls. Thus obtained sheet was pelletized using an angular pelletizer.

Subsequently, the pellets obtained as above were subjected to injection molding to mold it into a sheet (150 mm ×120 mm ×2 mm). The conditions for the injection molding are as follows.

Conditions for injection molding

Injection primary pressure: 1,000 kg/cm$^2$, 5-second cycle

Injection secondary pressure: 800 kg/cm$^2$, 5-second cycle

Injection speed: 40 mm/sec

Resin temperature: 230° C.

The above-obtained sheet was measured on stress at yield point ($Y_s$) and elongation at break ($E_L$) in accordance with a method defined by JIS K 6758, and was further measured on Izod impact strength in an atmosphere of 23° C. in accordance with ASTM D 256.

The results are set forth in Table 4.

Comparative Example 2

The procedure of Example 13 was repeated except for not using the higher α-olefin copolymer and subjecting the polypropylene itself to injection molding.

The results are set forth in Table 4.

TABLE 4

|  | Ex. 13 | Comp. Ex. 2 |
|---|---|---|
| $Y_s$ (kg/cm$^2$) | 300 | 370 |
| $E_L$ (%) | 690 | 650 |
| Izod impact strength (kg · cm/cm) | 10 | 3 |

[Example of vibration-insulating rubber molded product]

EXAMPLE 14

Preparation of vulcanized rubber

To the octene-1/1,5-hexadiene/7-methyl-1,6-octadiene copolymer (higher α-olefin copolymer) obtained in Example 1 were added additives set forth in Table 5, to obtain an unvulcanized rubber composition.

In the above procedure, the above-mentioned copolymer, zinc white, stearic acid and FEF carbon were kneaded with each other for 6 minutes using a 4.3-liter Banbury mixer (produced by Kobe Seikosho K. K.), and the resulting kneadate was allowed to stand for 1 day.

To the kneadate thus obtained were added a vulcanization accelerator and sulfur, and they were milled by means of open milling rolls (front roll/back roll: 50/60 °C. 16/18 rpm) to obtain a rubber composition

TABLE 5

| Composition | Amount [part(s) by weight] |
|---|---|
| Higher α-olefin copolymer | 100 |
| Stearic acid | 3 |
| Zinc white | 10 |
| FEF carbon 1) | 50 |
| Sulfur | 0.3 |
| Vulcanization accelerator 2) | 0.5 |
| Vulcanization accelerator 3) | 0.5 |

1) Trade name: Shiest SO, available from Tokai Carbon K.K.
2) Trade name: Nocseller M, available from Ouch Shinko Kagaku K.K.
3) Trade name: Nocseller TT, available from Ouchi Shinko Kagaku K.K.

The rubber composition obtained as above was heated for 20 minutes using a press heated to 160° C. to prepare a vulcanized sheet. The vulcanized sheet was subjected to the following tests. The test items are as follows.

Test items

Flexural test and adhesion test.

Test method

In the flexural test, resistance to crack growth was examined by means of de Mattia machine in accordance with JIS K 6301. That is, the vulcanized sheet was repeatedly flexed until a length of a crack reached 15 mm, and the number of flexure times was measured. The number of flexure times was taken as a measure of dynamic fatigue resistance. Further, the test strip having been aged under heating with hot air of 120° C. for 70 hours was subjected to the same flexural test.

In the adhesion test, adhesion of the vulcanized sheet to metal was examined in accordance with Method A of ASTM D 429. As an adhesive, Chemrock 253 (available from Road Far East Co.) was used.

The results are set forth in Table 6.

EXAMPLE 15

The procedure of Example 14 was repeated except for using the hexene-1/1,5-hexadiene/7-methyl-1,6-octadiene prepared in Example 5 instead of the copolymer prepared in Example 1.

The results are set forth in Table 6.

EXAMPLE 16

The procedure of Example 14 was repeated except for using the decene-1/1,6-heptadiene/7-methyl-1,6-octadiene prepared in Example 6 instead of the copolymer prepared in Example 1.

The results are set forth in Table 6.

Comparative Example 3

Natural rubber (RSS No. 3) was roughly milled by means of 14-inch open milling rolls so that the rubber had Mooney viscosity [$ML_{1+4}$ (100° C.)] of 60. To thus roughly milled natural rubber were added additives set forth in Table 7, and they were milled using open milling rolls to obtain an unvulcanized rubber composition.

Then, the rubber composition was heated for 60 minutes using a press heated to 140° C. to prepare a vulcanized sheet. The vulcanized sheet was subjected to the same tests as described in Example 14.

The results are set forth in Table 6.

Comparative Example 4

The procedure of Example 14 was repeated except for using an ethylene/propylene/5-ethylidene-2-norbornene copolymer having a molar ratio of ethylene to propylene of 75/25 (ethylene/propylene), an iodine value of 10 and Mooney viscosity [$ML_{1+4}$ (100° C.)] of 70, instead of the copolymer prepared in Example 1, and varying the amounts the components to those set forth in Table 8.

The results are set forth in Table 6.

TABLE 6

| | Example | | | Comp. Example | |
|---|---|---|---|---|---|
| | 14 | 15 | 16 | 3 | 4 |
| Dynamic fatigue resistance (number of times to crack growth) | | | | | |
| 1) before aging | >$10^6$ | >$10^6$ | >$10^6$ | 4 × $10^5$ | <$10^3$ |
| 2) after aging | >$10^6$ | >$10^6$ | >$10^6$ | <$10^3$ | <$10^3$ |
| Adhesion to metal | | | | | |
| State of debonding | R-100 | R-100 | R-100 | R-100 | R-25 RC-75 |

(Note 1) R-100: breakage of rubber portion = 100%
(Note 2) R-25: breakage of rubber portion = 25%
RC-75: interfacial debonding between rubber and adhesive 75%

TABLE 7

| Component of composition | Amount [part(s) by weight] |
|---|---|
| Natural rubber | 100 |
| Stearic acid | 2 |
| Zinc white | 3 |
| FEF carbon 1) | 40 |
| Process oil 2) | 10 |
| Aging inhibitor 3) | 1 |
| Sulfur | 0.3 |

TABLE 7-continued

| Component of composition | Amount [part(s) by weight] |
|---|---|
| Vulcanization accelerator 4) | 0.5 |

1) Trade name: Shiest SO, available from Tokai Carbon K.K.
2) Trade name: Diana Process Oil AH-16, available from Idemitsu Kosan K.K.
3) Trade name: Noclac DP, available from Ouchi Shinko Kagaku K.K.
4) Trade name: Nocseller DM, available from Ouchi Shinko Kagaku K.K.

TABLE 8

| Component of composition | Amount [part (s) by weight] |
|---|---|
| EPDM | 100 |
| Stearic acid | 1 |
| Zinc white | 5 |
| FEF carbon 1) | 40 |
| Process oil 2) | 10 |
| Sulfur | 1.5 |
| Vulcanization accelerator 3) | 1.5 |
| Vulcanization accelerator 4) | 0.5 |

1) Trade name: Shiest SO, available from Tokai Carbon K.K.
2) Trade name: Diana Process Oil PW-380, available from Idemitsu Kosan K.K.
3) Trade name: Nocseller TS, available from Ouchi Shinko Kagaku K.K.
4) Trade name: Nocseller M, available from Ouchi Shinko Kagaku K.K.

Example of rubber belt molded product

EXAMPLE 17

To the octene-1/1,5-hexadiene/7-methyl-1,6-octadiene copolymer obtained in Example 1 were added additives set forth in Table 9, to obtain an unvulcanized rubber composition.

TABLE 9

| Composition | Amount [part(s) by weight] |
|---|---|
| Higher α-olefin copolymer | 100 |
| Stearic acid | 3 |
| Zinc white | 5 |
| ISAF carbon black 1) | 60 |
| Sulfur | 0.3 |
| Vulcanization accelerator 2) | 0.5 |
| Vulcanization accelerator 3) | 0.2 |

1) Trade name: Asahi #80, available from Asahi Carbon K.K.
2) Trade name: Nocseller M, available from Ouchi Shinko Kagaku Kogyo K.K.
3) Trade name: Nocseller TT, available from Ouchi Shinko Kagaku Kogyo K.K.

In the above procedure, the above-mentioned copolymer, zinc white, stearic acid and ISAF carbon were kneaded with each other for 5 minutes using a 4.3-liter Banbury mixer (produced by Kobe Seikosho K. K.), and the resulting kneadate was allowed to stand for 1 day at room temperature. To the kneadate thus obtained were added the vulcanization accelerators and sulfur, and they were milled by means of open milling rolls to obtain a rubber composition. In this milling procedure, the surface temperatures of the front roll and the back roll were 50° C. and 60° C. respectively, and the rotation numbers of the front roll and the back roll were 16rpm and 18 rpm, respectively.

The rubber composition obtained as above was charged in a mold for forming a belt and in a mold for forming a specimen for flexural test, and the rubber composition in each mold was vulcanized for 20 minutes using a press heated to 160° C. The resulting vulcanized product was subjected to the following tests. The test items are as follows.

Test items

Tensile test, hardness test, aging test, flexural test, and measurement of elastic modulus.

Test method

The tensile test, hardness test, aging test and flexural test were carried out in accordance with JIS K 6301.

That is, tensile strength ($T_B$) and elongation ($E_B$) were measured in the tensile test, and JIS A hardness ($H_s$) was measured in the hardness test.

The aging test was conducted by heating the vulcanized product with hot air of 135° C. for 70 hours. In this test, retentions of physical properties of the vulcanized product before aging, that is, retention of tensile strength $A_R(T_B)$, retention of elongation $A_R(E_B)$ and changing ratio in hardness ($\Delta H_s$), were measured.

In the flexural test, resistance to crack growth was examined by means of de Mattia machine. That is, the specimen was repeatedly flexed until a length of a crack reached 15 mm, and the number of flexure times was measured.

As a measure of change of elastic modulus depending on a temperature, a complex elastic modulus ($G^*$) was measured at 10 Hz using a dynamic spectrometer (produced by Rheometric Co.).

The results are set forth in Table 11 and shown in FIG. 2.

EXAMPLE 18

The procedure of Example 17 was repeated except for using the hexene-1/1,5-hexadiene/7-methyl-1,6-octadiene copolymer obtained in Example 5 instead of the copolymer obtained in Example 1.

The results are set forth in Table 11 and shown in FIG. 2.

EXAMPLE 19

The procedure of Example 17 was repeated except for using the decene-1/1,6-heptadiene/7-methyl-1,6-octadiene copolymer obtained in Example 6 instead of the copolymer obtained in Example 1.

The results are set forth in Table 11 and shown in FIG. 2.

Comparative Example 5

The procedure of Example 17 was repeated except for using chloroprene rubber (trade name: Neoprene WRT, available from Dupont) and varying the components and the amounts to those set forth in Table 10.

The results are set forth in Table 11 and shown in FIG. 2.

TABLE 10

| Composition | Amount [part(s) by weight] |
|---|---|
| Chloroprene rubber | 100 |
| Stearic acid | 2 |
| Magnesia 1) | 4 |
| FEF carbon black 2) | 40 |
| Plasticizer 3) | 10 |
| Vulcanizing agent 4) | 5 |
| Vulcanization accelerator 5) | 0.5 |

1) Trade name: Kyowa Mag #150, available from Tokai Carbon K.K.
2) Trade name: Shiest SO, available from Tokai Carbon K.K.
3) Trade name: DOP, available from Hiroshima Wako K.K.
4) Trade name: Zinc White No. 1, available from Sakai Kagaku Kogyo K.K.
5) Trade name: Accel 22, available from Kawaguchi Kagaku Kogyo K.K.

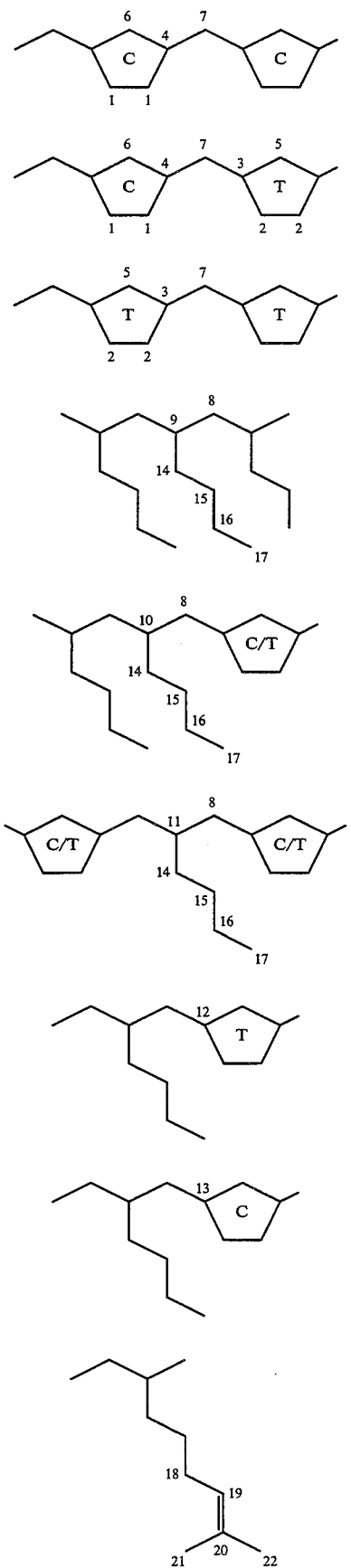

-continued

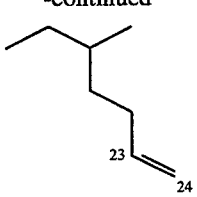

EXAMPLE 20

To the octene-1/1,5-hexadiene/7-methyl-1,6-octadiene copolymer obtained in Example 1 were added additives set forth in Table 12, to obtain an unvulcanized rubber composition.

TABLE 12

| Composition | Amount [part(s) by weight] |
|---|---|
| Higher α-olefin copolymer | 100 |
| Stearic acid | 3 |
| Zinc white | 10 |
| ISAF carbon black 1) | 50 |
| Sulfur | 0.3 |
| Vulcanization accelerator 2) | 0.5 |
| Vulcanization accelerator 3) | 0.2 |

1) Trade name: Asahi #80, available from Asahi Carbon K.K.
2) Trade name: Nocseller M, available from Ouchi Shinko Kagaku Kogyo K.K.
3) Trade name: Nocseller TT, available from Ouchi Shinko Kagaku Kogyo K.K.

In the above procedure, the above-mentioned copolymer, zinc white, stearic acid and ISAF carbon were kneaded with each other for 5 minutes using a 4.3-liter Banbury mixer (produced by Kobe Seikosho K. K.), and the resulting kneadate was allowed to stand for 1 day at room temperature. To the kneadate thus obtained were added the vulcanization accelerators and sulfur, and they were milled by means of open milling rolls to obtain a rubber composition. In this milling procedure, the surface temperatures of the front roll and the back roll were 50° C. and 60° C., respectively, and the rotation numbers of the front roll and the back roll were 16 rpm and 18 rpm, respectively.

The rubber composition obtained as above was heated for 30 minutes by means of a press heated to 160° C. to prepare a vulcanized sheet. The vulcanized sheet was subjected to the following tests. The test items are as follows.

Test items

Tensile test, hardness test, aging test, flexural test, ozone resistance test and weathering test.

Test method

The tensile test, hardness test, aging test, ozone resistance test and flexural test were carried out in accordance with JIS K 6301.

That is, tensile strength ($T_B$), elongation ($E_B$) and tear strength ($T_R$) were measured in the tensile test, and JIS A hardness ($H_s$) was measured in the hardness test.

The aging test was conducted by heating the vulcanized sheet with hot air of 100° C. for 70 hours. In this test, retentions of physical properties of the vulcanized product before aging, that is, retention of tensile strength $A_R(T_B)$ and retention of elongation $A_R(E_B)$, were measured.

The ozone resistance test was conducted in an ozone testing vessel (static test, ozone concentration: 50 pphm, elongation rate: 20% temperature: 40° C. time: 200 hours), and a period of time at the end of which crack occurred was measured.

In the flexural test, resistance to crack growth was examined by means of de Mattia machine. That is, the vulcanized sheet was repeatedly flexed until a length of a crack reached 15 mm, and the number of flexure times was measured. Further, the specimen having been aged under heating with hot air of 120° C. for 70 hours was also subjected to the same flexural test.

The weathering test was carried out in accordance with JIS B 7753, and the vulcanized sheet was measured on retention of tensile strength $A_R(T_B)$ and retention of elongation $A_R(E_B)$ after the sunshine weatherometer exposure time of 1,000 hours.

The results are set forth in Table 15.

EXAMPLE 21

The procedure of Example 20 was repeated except for using the hexene-1/1,5-hexadiene/7-methyl-1,6-octadiene copolymer obtained in Example 5 instead of the copolymer obtained in Example 1.

The results are set forth in Table 15.

EXAMPLE 22

The procedure of Example 20 was repeated except for using the decene-1/1,6-heptadiene/7-methyl-1,6-octadiene copolymer obtained in Example 6 instead of the copolymer obtained in Example 1.

The results are set forth in Table 15.

Comparative Example 6

The procedure of Example 20 was repeated except for using an ethylene/propylene/5-ethylidene-2-norbornene copolymer (abbreviated to "EPDM (1)" hereinafter) having a molar ratio of ethylene to propylene of 67/33 (ethylene/propylene), Mooney viscosity [$ML_{1+4}$ (100° C.)] of 63 and an iodine value of 20, instead of the copolymer prepared in Example 1, and varying the amounts and the components to those set forth in Table 13.

The results are set forth in Table 15.

TABLE 13

| Composition | Amount [part(s) by weight] |
|---|---|
| EPDM | 100 |
| Stearic acid | 1 |
| Zinc white | 5 |
| FEF carbon black 1) | 80 |
| Process oil 2) | 20 |
| Triallyl isocyanate | 2.0 |
| Dicumyl peroxide | 6.8 |

1) Trade name: Asahi #80, available from Asahi Carbon K.K.
2) Trade name: Diana Process Oil PW-90, available from Idemitsu Kosan K.K.

Comparative Example 7

The procedure of Example 20 was repeated except for using natural rubber (RSS #3) and chloroprene rubber (trade name: Neoprene WRT, available from Dupont) and varying the components and the amounts to those set forth in Table 14. The results are set forth in Table 15.

TABLE 14

| Composition | Amount [part(s) by weight] |
|---|---|
| Natural rubber | 60 |
| Chloroprene rubber | 40 |
| Stearic acid | 1 |

TABLE 14-continued

| Composition | Amount [part(s) by weight] |
|---|---|
| Zinc white | 5 |
| FEF carbon black 1) | 100 |
| Process oil 2) | 20 |
| Trimethylolpropane trimethacrylate 3) | 1 |
| Dicumyl peroxide | 6.8 |
| Mercaptobenzimidazole | 1 |
| Polymer of 2,2,4-trimethyl-1,2-dihydroquinoline | 0.5 |

1) Trade name: Asahi #80, available from Asahi Carbon K.K.
2) Trade name: Diana Process Oil PW-90, available from Idemitsu Kosan K.K.
3) Trade name: Highcross, Seiko Kagaku Kogyo K.K.

EXAMPLE 23

The rubber composition obtained in the same manner as described in Example 20 was extrusion molded into a molded product of wiper blade form, and the molded product was vulcanized in a steam under a pressure of 6.5 kg/cm² for 30 minutes to obtain a wiper blade rubber molded product.

The wiper blade rubber molded product thus obtained was evaluated on friction characteristics and ozone resistance in the following manner.

The results are set forth in Table 15.

Test method (1) Friction characteristics
(a) Friction coefficient

The wiper blade rubber molded product was subjected to durability test using a flat glass plate under the following conditions, and a friction coefficient of the rubber molded product in a dry state was measured.
Wiper blade rubber length: 100 mm
Arm load: 155 g
Stroke length: 150 mm
Speed: 45 reciprocations per minute
Cycle of water spray: 1-minute water spraying and 4-minute water stopping
(b) Friction coefficient after weathering test The test strip having been subjected to sunshine weatherometer exposure of 1,000 hours was measured on the friction coefficient in the same manner as described in the above test (a).

(2) Ozone resistance

The ozone resistance test was conducted in an ozone testing vessel (static test, ozone concentration: 50 pphm, elongation rate 20%, temperature: 40° C. time: 200 hours), and a period of time at the end of which crack occurred was measured.

EXAMPLE 24

The rubber composition obtained in the same manner as described in Example 20 and the rubber composition for wiper blade obtained in Comparative Example 7 were subjected to two-layer extrusion molding to prepare a wiper blade whose surface was covered with the rubber composition of Example 20, and thus prepared wiper blade was vulcanized in a steam under a pressure of 6.5 kg/cm² for 30 minutes to obtain a wiper blade rubber molded product.

The wiper blade rubber molded product thus obtained was evaluated on friction characteristics and ozone resistance in the same manner as described in Example 23.

The results are set forth in Table 15.

Comparative Example 8

The procedure of Example 24 was repeated except for using the rubber composition obtained in the same manner as described in Comparative Example 6 instead of the rubber composition obtained in the same manner as described in Example 20.

The results are set forth in Table 15.

Comparative Example 9

The procedure of Example 24 was repeated except for preparing a wiper blade whose surface was coated with the rubber composition for wiper blade obtained in Comparative Example 7 by the same two-layer extrusion molding as described in Example 20.

The results are set forth in Table 15.

TABLE 15

|  | Ex. 20 | Ex. 21 | Ex. 22 | Comp. Ex.6 | Comp. Ex.7 |
|---|---|---|---|---|---|
| Higher α-olefin copolymer | Ex. 1 | Ex. 5 | Ex. 6 | — | — |
| EPDM | — | — | — | EPDM(1) | — |
| Chloroprene rubber | — | — | — | — | Neoprene WRT |
| Physical property in dry state | | | | | |
| $T_B$ [kg/cm²] | 142 | 155 | 137 | 145 | 160 |
| $E_B$ [%] | 610 | 620 | 590 | 300 | 600 |
| $T_R$ [kg/cm] | 29 | 30 | 28 | 37 | 42 |
| $H_S$ JIS A | 53 | 58 | 51 | 58 | 60 |
| Thermal aging resistance | | | | | |
| $A_R(T_B)$ [%] | 105 | 107 | 107 | 98 | 110 |
| $A_R(E_B)$ [%] | 93 | 95 | 92 | 97 | 85 |
| Weathering resistance | | | | | |
| $A_R(T_B)$ [%] | 99 | 98 | 99 | 95 | 45 |
| $A_R(E_B)$ [%] | 98 | 98 | 98 | 87 | 50 |
| Change of appearance | None | None | None | None | Observed |
| Ozone resistance | | | | | |
| Crack occurrence time [hr] | >1000 | >1000 | >1000 | >1000 | 60 |
| Flexural test (Number of times to crack growth) | | | | | |
| 1) before aging | >10⁵ | >10⁵ | >10⁵ | <10³ | >10⁵ |
| 2) after aging | >10⁵ | >10⁵ | >10⁵ | <10³ | <10³ |

TABLE 15-continued

|  | Ex. 23 | Ex. 24 | Ex. 8 | Ex. 9 |
|---|---|---|---|---|
| Surface layer of wiper blade | | | | |
| Higher α-olefin copolymer | Ex. 1 | Ex. 1 | — | Ex. 1 |
| EPDM | — | — | EPDM(1) | — |
| Chloroprene rubber | — | — | — | Neoprene WRT |
| Friction characteristics | | | | |
| a) Friction coefficient Number of blade reciprocation times | | | | |
| 0 | 0.75 | 0.74 | 1.02 | 1.05 |
| 53 | 0.79 | 0.77 | 1.10 | 1.70 |
| b) Friction coefficient after weathering test Number of blade reciprocation times | | | | |
| 0 | 0.76 | 0.74 | 1.05 | 1.23 |
| 53 | 0.77 | 0.78 | 1.15 | 2.15 |
| Ozone resistance | | | | |
| Crack occurrence time [hr] | >1000 | >1000 | >1000 | 60 |

Example of rubber molded product for roll

EXAMPLE 25

To the octene-1/1,5-hexadiene/7-methyl-1,6-octadiene copolymer obtained in Example 1 were added additives set forth in Table 16, to obtain an unvulcanized rubber composition.

TABLE 16

| Composition | Amount [part(s) by weight] |
|---|---|
| Higher α-olefin copolymer | 100 |
| Stearic acid | 3 |
| Zinc white 1) | 5 |
| FEF carbon black 2) | 60 |
| Process oil 3) | 10 |
| Vulcanizing agent 4) | 0.6 |
| Vulcanization accelerator 5) | 0.3 |
| Vulcanization accelerator 6) | 0.6 |

1) Trade name: Zinc White No. 1, available from Sakai Kagaku Kogyo K.K.
2) Trade name: Asahi #60, available from Asahi Carbon K.K.
3) trade name: Diana Process Oil PW-380, available from Idemitsu Kosan K.K.
4) Trade name: Barnock R, available from Ouchi Shinko Kagaku Kogyo K.K.
5) Trade name: Nocseller TRA, available from Ouchi Shinko Kagaku Kogyo K.K.
6) Trade name: Nocseller TT, available from Ouchi Shinko Kagaku Kogyo K.K.

In the above procedure, the above-mentioned copolymer, zinc white, stearic acid, FEF carbon and process oil were kneaded with each other for 5 minutes using a 4.3-liter Banbury mixer (produced by Kobe Seikosho K. K.), and the resulting kneadate was allowed to stand for 1 day at room temperature. To the kneadate thus obtained were added the vulcanization accelerators, and they were milled by means of open milling rolls to obtain a rubber composition. The rubber composition was rolled to obtain a rubber composition sheet having a thickness of about 2 mm. In the above milling procedure, the surface temperatures of the front roll and the back roll were 50° C. and 60° C., respectively, and the rotation numbers of the front roll and the back roll were 16 rpm and 18 rpm, respectively.

The above-obtained rubber sheet was wound up around a metallic core of hollow pipe form (SUS 304) having an outer diameter of 60 mm, then a cloth (glass fiber tape) was wound up helically on the surface of the rubber sheet, and vulcanization of the rubber sheet was carried out at 160° C. for 30 minutes. After completion of the vulcanization, the vulcanized rubber was cooled and separated from the metallic core. The vulcanized rubber was then punched to obtain a dumbbell specimen of No. 3 type based on JIS K 6301. Thereafter, the specimen was measured on stress at break $T_B(1)$ and elongation at break $E_B(1)$ in accordance with JIS K 6301 under the conditions of a tensile rate of 500 mm/min and a temperature of 25° C. Further, the above-obtained vulcanized rubber was also measured on JIS A hardness $H_S(1)$ in accordance with JIS K 6301.

Subsequently, the dumbbell specimen of No. 3 type was exposed to air at 150° C. for 3 days using Test Tube Aging Tester (produced by Toyo Seiki Seisakusho K. K. ). Then, the aged dumbbell specimen was measured on the stress at break $T_B(2)$, the elongation at break $E_B(2)$ and the JIS A hardness $H_S(2)$ in the same manner as described above.

The breaking energy can be expressed approximately by a tensile product $(T_B \times E_B)$, so that a ratio (TE) between the tensile product before aging and the tensile product after aging and a difference $(\Delta H_S)$ between the JIS A hardness before aging and the JIS A hardness after aging were calculated by the following formulas, and the obtained values were taken as a measure of thermal aging resistance.

$$TE(\%) = [(T_B \text{ after aging}) \times (E_B \text{ after aging}) \times 100] / [(T_B \text{ before aging}) \times (E_B \text{ before aging})]$$

$$\Delta H_S = H_S(2) - H_S(1)$$

The above-mentioned tensile product is described in R. D. Allen, "J. Elastomers & Plastics" 17 April, pp 150–164 (1985).

Further, a vulcanized specimen having a thickness of 12.7 mm and a diameter of 29.0 mm was formed from the above-mentioned rubber composition for roll in accordance with JIS K 6301, and the specimen was subjected to a permanent compression set test.

Moreover, a vulcanized specimen was formed from the above-mentioned rubber composition in accordance with ASTM D 2228. The specimen was subjected to a Pico abrasion test, and an abrasion index of the specimen was determined.

Then, the unvulcanized sheet of the rubber composition having a thickness of 2 mm was punched to give a dumbbell specimen of No. 1 type based on JIS K 6301.

The specimen was subjected to a tensile test under the conditions of a tensile rate of 100 mm/min and a temperature of 23° C. to determine the tensile strength at yield, and the obtained value was taken as a measure of shape retention of the unvulcanized rubber composition.

The results are set forth in Table 18.

EXAMPLE 26

The procedure of Example 25 was repeated except for using the hexene-1/1,5-hexadiene/7-methyl-1,6-octadiene copolymer obtained in Example 5 instead of the copolymer obtained in Example 1.

The results are set forth in Table 18.

Example 27

The procedure of Example 25 was repeated except for using the decene-1/1,6-heptadiene/7-methyl-1,6-octadiene copolymer obtained in Example 6 instead of the copolymer obtained in Example 1.

The results are set forth in Table 18.

Comparative Example 10

The procedure of Example 25 was repeated except for using an ethylene/propylene/5-ethylidene-2-norbornene copolymer (abbreviated to "EPDM (2)" hereinafter) having a molar ratio of ethylene to propylene of 80/20 (ethylene/propylene), Mooney viscosity [$ML_{1+4}$ (100° C.)] of 120 and an iodine value of 10, instead of the copolymer prepared in Example 1, and varying the amounts and the components to those set forth in Table 17.

The results are set forth in Table 18.

TABLE 17

| Composition | Amount [part(s) by weight] |
|---|---|
| EPDM | 100 |
| Stearic acid | 1 |
| Zinc white | 5 |
| FEF carbon black 1) | 40 |
| Process oil 2) | 100 |
| Sulfur | 1.5 |
| Vulcanization accelerator 3) | 1.5 |
| Vulcanization accelerator 4) | 0.5 |

1) Trade name: Asahi #80, available from Asahi Carbon K.K.
2) Trade name: Diana Process Oil PW-90, available from Idemitsu Kosan K.K.
3) Trade name: Nocseller TS, available from Ouchi Shinko Kagaku Kogyo K.K.
4) Trade name: Nocseller M, available from Ouchi Shinko Kagaku Kogyo K.K.

TABLE 18

|  | Ex. 25 | Ex. 26 | Ex. 27 | Comp. Ex. 10 |
|---|---|---|---|---|
| Higher α-olefin copolymer | Ex. 1 | Ex. 5 | Ex. 6 | — |
| EPDM | — | — | — | EPDM(2) |
| Physical property in dry state | | | | |
| $T_B(1)$ [kg/cm$^2$] | 65 | 81 | 61 | 58 |
| $E_B(1)$ [%] | 710 | 720 | 690 | 590 |
| $H_S(1)$ | 30 | 32 | 29 | 30 |
| Thermal aging resistance | | | | |
| $T_B(2)$ [kg/cm$^2$] | 107 | 108 | 105 | 110 |
| $E_B(2)$ [%] | 89 | 91 | 88 | 82 |
| TE [%] | 95 | 98 | 92 | 90 |
| $\Delta H_S$ | 6 | 6 | 7 | 8 |
| Permanent compression set [%] | | | | |
| 100° C., 70 hrs | 18 | 18 | 21 | 45 |
| −10° C., 70 hrs | 8 | 9 | 10 | 38 |
| Abrasion index | 81 | 90 | 80 | 50 |
| Strength at yield of unvulcanized rubber [k/cm$^2$] | 8 | 9 | 6 | 2 |

What is claimed is:

1. A higher α-olefin copolymer of higher α-olefin having 6 to 20 carbon atoms, α,ω-diene represented by the following formula (I) and non-conjugated diene represented by the following formula (II), said copolymer having:

(A) a molar ratio of the higher α-olefin to the α,ω-diene of 90/10 to 50/50, (B) a content of the non-conjugated diene of 0.01 to 30% by mol, and (C) an intrinsic viscosity ($\eta$), as measured in decahydronaphthalene at 135° C., of 1.0 to 10.0 dl/g;

$$CH_2=CH-\left[\begin{array}{c} R^1 \\ | \\ C \\ | \\ R^2 \end{array}\right]_n-CH=CH_2 \quad (I)$$

wherein n is an integer of 1 to 3, $R^1$ and $R^2$ are each independently a hydrogen atom or an alkyl group having 1 to 8 carbon atoms;

$$CH_2=CH-(CH_2)_n-\underset{R^4}{C}=\underset{R^5}{C}-R^3 \quad (II)$$

wherein n is an integer of 1 to 5, $R^3$ is an alkyl group having 1 to 4 carbon atoms, and $R^4$ and $R^5$ are each independently a hydrogen atom or an alkyl group having 1 to 8 carbon atoms, provided that both of $R^4$ and $R^5$ are not hydrogen atoms.

2. The higher α-olefin copolymer of claim 1 wherein the molar ratio of the higher α-olefin to the α,ω-diene is in the range of from 90/10 to 60/40.

3. The higher α-olefin copolymer of claim 1 wherein the content of the non-conjugated diene is in the range of from 0.1 to 20% by mole.

4. The higher α-olefin copolymer of claim 1 which has an intrinsic viscosity ($\eta$), as measured in decahydronaphthalene at 135° C. of 1.5 to 7 dl/g.

5. The higher α-olefin copolymer of claim 1 which has an iodine value of from 1 to 50.

6. The higher α-olefin copolymer of claim 1 wherein the higher α-olefin is at least one selected from the group consisting of hexene-1, octene-1 and decene-1.

7. The higher α-olefin copolymer of claim 1 wherein the α,ω-diene is at least one selected from the group consisting of 1,5-hexadiene and 1,6-heptadiene.

8. The higher α-olefin copolymer of claim 1 wherein the non-conjugated diene is 7-methyl-1,6-octadiene.

9. A vibration-insulating rubber molded product comprising a vulcanized product of a higher α-olefin copolymer said copolymer being a copolymer of higher α-olefin having 6 to 20 carbon atoms, α,ω-diene represented by the following formula (I) and non-conjugated diene represented by the following formula (II) and having:

(A) a molar ratio of the higher α-olefin to the α,ω-diene ranging from of 90/10 to 50/50, (B) a content of the non-conjugated diene of 0.01 to 30% mol, and
(C) an intrinsic viscosity ($\eta$), as measured in decahydronaphthalene at 135° C., of 1.0 to 10.0 dl/g;

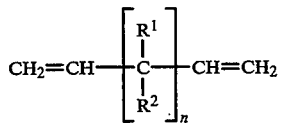

wherein n is an integer of 1 to 3, $R^1$ and $R^2$ are each independently a hydrogen atom or an alkyl group having 1 to 8 carbon atoms;

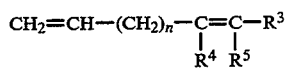

wherein n is an integer of 1 to 5, $R^3$ is an alkyl group having 1 to 4 carbon atoms, and $R^4$ and $R^5$ are each independently a hydrogen atom or an alkyl group having 1 to 8 carbon atoms, provided that both of $R^4$ and $R^5$ are not hydrogen atoms.

10. The vibration-insulating rubber molded product of claim 9 wherein the molar ratio of the higher $\alpha$-olefin to the $\alpha,\omega$-diene in said copolymer is in the range of from 90/10 to 60/40.

11. The vibration-insulating rubber molded product of claim 9 wherein the content of the non-conjugated diene in said copolymer is in the range of from 0.1 to 20% by mole.

12. The vibration-insulating rubber molded product of claim 9 wherein said copolymer has an intrinsic viscosity ($\eta$), as measured in decahydronaphthalene at 135° C. of 1.5 to 7 dl/g.

13. The vibration-insulating rubber molded product of claim 9 wherein said copolymer has an iodine value of from 1 to 50.

14. The vibration-insulating rubber molded product of claim 9 wherein the higher $\alpha$-olefin is at least one selected from the group consisting of hexene-1, octene-1 and decene-1.

15. The vibration-insulating rubber molded product of claim 9 wherein the $\alpha,\omega$-diene is at least one selected from the group consisting of 1,5-hexadiene and 1,6-heptadiene.

16. The vibration-insulating rubber molded product of claim 9 wherein the non-conjugated diene is 7-methyl-1,6octadiene.

17. A vibration-insulating rubber molded product comprising a vulcanized product of a higher $\alpha$-olefin copolymer, said copolymer being a copolymer of higher $\alpha$-olefin having 6 to 10 carbon atoms, $\alpha,\omega$-diene represented by the following formula (I) and non-conjugated diene represented by the following formula (II) and having:

(A) a molar ratio of the higher $\alpha$-olefin to the $\alpha,\omega$-diene of 90/10 to 60/40,
(B) a content of the non-conjugated diene of 0.01 to 20% by mol, and
(C) an intrinsic viscosity ($\eta$), as measured in decahydronaphthalene at 135° C., of 1.0 to 10.0 dl/g;

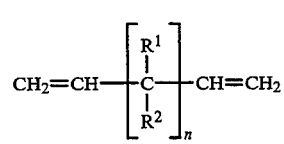

wherein n is an integer of 1 to 3, $R^1$ and $R^2$ are each independently a hydrogen atom or methyl;

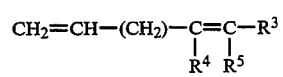

wherein n is an integer of 1 to 4, $R^3$ is an alkyl group having 1 to 2 carbon atoms, and $R^4$ and $R^5$ are each independently a hydrogen atom or an alkyl group having 1 to 2 carbon atoms, provided that both of $R^4$ and $R^5$ are not hydrogen atoms.

18. The higher $\alpha$-olefin copolymer of claim 17 which has an iodine value of from 1 to 50.

19. The higher $\alpha$-olefin copolymer of claim 17 wherein the higher $\alpha$-olefin is at least one selected from the group consisting of hexene-1, octene-1 and decene-1.

20. The higher e-olefin copolymer of claim 17 wherein the $\alpha,\omega$-diene is at least one selected from the group consisting of 1,5-hexadiene and 1,6-heptadiene.

21. The higher $\alpha$-olefin copolymer of claim 17 wherein the non-conjugated diene is 7-methyl-1,6-octadiene.

22. A higher $\alpha$-olefin copolymer of higher $\alpha$-olefin having 6 to 10 carbon atoms, $\alpha,\omega$-diene represented by the following formula (I) and non-conjugated diene represented by the following formula (II), said copolymer having:

(A) a molar ratio of the higher $\alpha$-olefin to the $\alpha,\omega$-diene of 90/10 to 60/40,
(B) a content of the non-conjugated diene of 0.01 to 20% by mol, and
(C) an intrinsic viscosity ($\eta$), as measured in decahydronaphthalene at 135° C. of 10 to 7.0 dl/g;

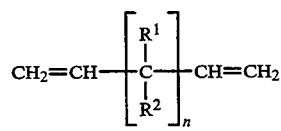

wherein n is an integer of 1 to 3, $R^1$ and $R^2$ are each independently a hydrogen atom or methyl;

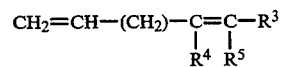

wherein n is an integer of 1 to 4, $R^3$ is an alkyl group having 1 to 2 carbon atoms, and $R^4$ and $R^5$ are each independently a hydrogen atom or an alkyl group having 1 to 2 carbon atoms, provided that both of $R^4$ and $R^5$ are not hydrogen atoms.

23. The higher $\alpha$-olefin copolymer of claim 22 which has an iodine value of 1 to 50.

24. The higher $\alpha$-olefin copolymer of claim 22 wherein the higher $\alpha$-olefin is at least one selected from the group consisting of hexene-1 octene-1 and decene-1.

25. The higher α-olefin copolymer of claim 22 wherein the α,ω-diene is at least one selected from the group consisting of 1,5-hexadiene and 6-heptadiene.

26. The higher α-olefin copolymer of claim 22 wherein the non-conjugated diene is 7-methyl-1,6-octadiene.

27. A process for the preparation of a vibration-insulating rubber molded product comprising molding and vulcanizing a higher α-olefin copolymer, said copolymer being a copolymer of higher α-olefin having 6 to 20 carbon atoms, α,ω-diene represented by the following formula (I) and non-conjugated diene represented by the following formula (II) and having:

(A) a molar ratio of the higher α-olefin to the α,ω-diene of 90/10 to 50/50, (B) a content of the non-conjugated diene of 0.01 to 30% mol, and (C) an intrinsic viscosity (η), as measured in decahydronaphthalene at 135° C., of 1.0 to 10.0 dl/g;

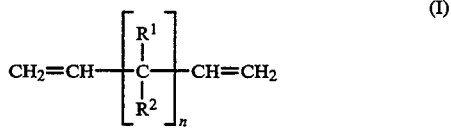

wherein n is an integer of 1 to 3, $R^1$ and $R^2$ are each independently a hydrogen atom or an alkyl group having 1 to 8 carbon atoms;

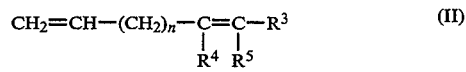

wherein n is an integer of 1 to 5, $R^3$ is an alkyl group having 1 to 4 carbon atoms, and $R^4$ and $R^5$ are each independently a hydrogen atom or an alkyl group having 1 to 8 carbon atoms, provided that both of $R^4$ and $R^5$ are not hydrogen atoms.

28. The process of claim 27 for preparing the vibration-insulating rubber molded product wherein the molar ratio of the higher α-olefin to the α,ω-diene in said copolymer is in the range of from 90/10 to 60/40.

29. The process of claim 27 for preparing the vibration-insulating rubber molded product wherein the content of the non-conjugated diene in said copolymer is in the range of from 0.1 to 20% by mole.

30. The process of claim 27 for preparing the vibration-insulating rubber molded product wherein said copolymer has an intrinsic viscosity (η), as measured in decahydronaphthalene at 135° C. of 1.5 to 7 dl/g.

31. The process of claim 27 for preparing the vibration-insulating rubber molded product wherein said copolymer has an iodine value of from 1 to 50.

32. The process of claim 27 for preparing the vibration insulating rubber molded product wherein the higher α-olefin is at least one selected from the group consisting of hexene-1, octene-1 and decene-1.

33. The process of claim 27 for preparing the vibration-insulating rubber molded product wherein the α,ω-diene is at least one selected from the group consisting of 1,5-hexadiene and 1,6-heptadiene.

34. The process of claim 27 for preparing the vibration-insulating rubber molded product wherein the non-conjugated diene is 7-methyl-1,6-octadiene.

* * * * *